United States Patent
Kumar et al.

(10) Patent No.: US 10,405,172 B2
(45) Date of Patent: Sep. 3, 2019

(54) TECHNIQUES FOR USING TARGET INFORMATION IN WIRELESS COMMUNICATIONS

(71) Applicant: QUALCOMM Incorporated, San Diego, CA (US)

(72) Inventors: Akash Kumar, Hyderabad (IN); Ankita, Hyderabad (IN); Ashutosh Giri, Patna (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/787,578

(22) Filed: Oct. 18, 2017

(65) Prior Publication Data

US 2019/0116488 A1    Apr. 18, 2019

(51) Int. Cl.
*H04W 8/18* (2009.01)
*H04W 8/20* (2009.01)
(Continued)

(52) U.S. Cl.
CPC .............. *H04W 8/183* (2013.01); *H04L 12/14* (2013.01); *H04M 15/00* (2013.01); *H04M 15/80* (2013.01);
(Continued)

(58) Field of Classification Search
CPC ......... H04W 8/22; H04W 4/26; H04W 4/183; H04W 8/183; H04W 4/24; H04W 8/205;
(Continued)

(56) References Cited

U.S. PATENT DOCUMENTS

| 7,613,480 B2 | 11/2009 | Brown |
| 8,519,963 B2 | 8/2013 | Kocienda et al. |

(Continued)

FOREIGN PATENT DOCUMENTS

| EP | 1954076 A1 | 8/2008 |
| WO | WO2016118249 A1 | 7/2016 |

OTHER PUBLICATIONS

International Search Report and Written Opinion—PCT/US2018/056497—ISA/EPO—dated Feb. 15, 2019.
(Continued)

*Primary Examiner* — Julio R Perez
(74) *Attorney, Agent, or Firm* — Holland & Hart LLP

(57) ABSTRACT

Methods, systems, and devices for wireless communications are described. A source user equipment (UE) may determine which subscriber identity module (SIM) card to use based on information of the target UE. For example, the target UE may have poor call quality using a first SIM, but high call quality when using a second SIM. The target UE may indicate the call quality for each SIM in subscription information to the source UE. The source UE may determine to use the second SIM of the target UE instead of the first SIM, resulting in higher call quality for the target UE. The subscription information may include a variety of information related to the target UE, such as subscriptions of the target UE, RAT availabilities for the target UE, etc. The target UE may also configure settings for receiving or rejecting data calls. The target UE may configure whether to receive data calls based on connectivity parameters.

52 Claims, 13 Drawing Sheets

(51) Int. Cl.
*H04L 12/14* (2006.01)
*H04M 15/00* (2006.01)
*H04M 17/02* (2006.01)
*H04M 17/00* (2006.01)
*H04W 4/24* (2018.01)
*H04W 48/18* (2009.01)
*H04W 84/04* (2009.01)
*H04M 3/22* (2006.01)
*H04M 3/42* (2006.01)
*H04W 88/02* (2009.01)

(52) U.S. Cl.
CPC ... *H04M 15/8016* (2013.01); *H04M 15/8022* (2013.01); *H04M 15/8044* (2013.01); *H04M 17/02* (2013.01); *H04M 17/103* (2013.01); *H04W 4/24* (2013.01); *H04W 8/205* (2013.01); *H04W 48/18* (2013.01); *H04M 3/2227* (2013.01); *H04M 3/42093* (2013.01); *H04M 15/8033* (2013.01); *H04W 84/042* (2013.01); *H04W 88/02* (2013.01)

(58) Field of Classification Search
CPC ... H04W 48/18; H04W 84/042; H04W 88/02; H04L 12/14; H04M 15/00; H04M 15/80; H04M 15/8016; H04M 15/8022; H04M 15/8044; H04M 17/02; H04M 17/103; H04M 3/2227; H04M 3/42093; H04M 15/8033

USPC .......................................... 455/418, 558, 419
See application file for complete search history.

(56) References Cited

U.S. PATENT DOCUMENTS

| | | |
|---|---|---|
| 9,763,180 B1 | 9/2017 | Lee et al. |
| 2010/0128699 A1* | 5/2010 | Yang ..................... H04W 76/15 370/335 |
| 2013/0210484 A1 | 8/2013 | Jeenagala et al. |
| 2013/0301438 A1 | 11/2013 | Li et al. |
| 2014/0171038 A1 | 6/2014 | Singvall et al. |
| 2015/0017962 A1* | 1/2015 | Howard .................. H04W 8/22 455/418 |
| 2015/0092611 A1 | 4/2015 | Ponukumati et al. |
| 2016/0088467 A1 | 3/2016 | Reddem et al. |
| 2016/0094982 A1 | 3/2016 | Xu et al. |
| 2016/0149605 A1* | 5/2016 | Vecera ................. H04B 1/3816 455/558 |
| 2017/0055195 A1 | 2/2017 | Ingale et al. |
| 2017/0070346 A1* | 3/2017 | Lombardi ........... H04L 63/0428 |

OTHER PUBLICATIONS

Partial International Search Report—PCT/US2018/056497—ISA/EPO—dated Dec. 14, 2018.

* cited by examiner

US 10,405,172 B2

TECHNIQUES FOR USING TARGET INFORMATION IN WIRELESS COMMUNICATIONS

BACKGROUND

The following relates generally to wireless communication, and more specifically to techniques for using target information in wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

When making a call to a target UE, a source UE may determine to use a given subscriber identity module (SIM) card based on a variety of factors such as channel quality, interference, coverage area, etc. The factors considered by the source UE, however, may only be from one perspective (e.g., the source UE perspective) and in some cases, a given SIM card may be selected by the source UE that leads to poor call quality at the target UE. For instance, a SIM card may be selected and used by a source UE for making a call to a target UE even if the selected SIM card has poor channel quality or is experiencing interference at the target UE. The selection of a SIM card that is beneficial for the source UE but not the target UE may result in poor call performance, expensive calls, or even dropped calls.

SUMMARY

A UE may support communication using multiple SIM cards and may selectively utilize any one of the multiple SIMs when making calls. When making a call to a target UE, a source UE may consider information of the target UE and determine which SIM card to use based on the information of the target UE. For example, the target UE may have poor call quality when using a first SIM, but high call quality when using a second SIM. The target UE may indicate the call quality for each SIM (e.g., in subscription information sent to or accessible by the source UE). Thus, the source UE may determine to call using the second SIM instead of the first SIM if doing so may result in higher call quality for the target UE. The subscription information may include a variety of information related to the target UE, such as subscriptions of the target UE, radio access technology (RAT) availabilities for the target UE, etc. The target UE may select which information to share with the source UE through a configurable graphical user interface (GUI) of the target UE. In some examples, the source UE may determine a SIM card to use based on a combination of source UE subscription information and target UE subscription information. The source UE may determine a SIM card to use for the target UE as well as for the source UE (e.g., select its own SIM card if the source UE is a multi-SIM device).

In some systems, a UE may configure settings for whether to receive or reject data calls. The target UE may configure whether to receive data calls based on a set of connectivity parameters, such as RAT preferences or contact information preferences (e.g., a data call block list). In some cases, the target UE may be configured to receive data calls from the source UE when certain RATs are available. In some other examples, the target UE may be configured to receive data calls from specified contacts (e.g., in an address book of the target UE) and otherwise reject the data call. In some cases, the target UE may receive data calls based on the application used to receive the data call. For example, the target UE may be configured to receive data calls for a first application, whereas data calls may be disabled for a second application. The target UE may also be configured to receive data calls based on the current time (e.g., configured to receive data calls within a specified window of time) or current location. The target UE may be able to configure data call settings for a set of settings, such as enabling data calls for specific users on specific applications, among other combinations.

A method of wireless communication is described. The method may include identifying, by a first UE, a set of subscription parameters for a second UE, determining, based at least in part on the set of subscription parameters for the second UE, a SIM to use for communication with the second UE, and communicating with the second UE using the determined SIM.

An apparatus for wireless communication is described. The apparatus may include means for identifying, by a first UE, a set of subscription parameters for a second UE, means for determining, based at least in part on the set of subscription parameters for the second UE, a SIM to use for communication with the second UE, and means for communicating with the second UE using the determined SIM.

Another apparatus for wireless communication is described. The apparatus may include a processor, memory in electronic communication with the processor, and instructions stored in the memory. The instructions may be operable to cause the processor to identify, by a first UE, a set of subscription parameters for a second UE, determine, based at least in part on the set of subscription parameters for the second UE, a SIM to use for communication with the second UE, and communicate with the second UE using the determined SIM.

A non-transitory computer readable medium for wireless communication is described. The non-transitory computer-readable medium may include instructions operable to cause a processor to identify, by a first UE, a set of subscription parameters for a second UE, determine, based at least in part on the set of subscription parameters for the second UE, a SIM to use for communication with the second UE, and communicate with the second UE using the determined SIM.

Some examples of the method, apparatus, and non-transitory computer-readable medium described above may further include processes, features, means, or instructions for transmitting, to the second UE, a request for subscription parameters for one or more SIM cards of the second UE. Some examples of the method, apparatus, and non-transitory computer-readable medium described above may further include processes, features, means, or instructions for receiving, from the second UE, the subscription parameters for one or more SIM cards of the second UE in response to the request, wherein the identified set of subscription parameters for the second UE may be based at least in part on the subscription parameters for one or more SIM cards of the second UE.

Some examples of the method, apparatus, and non-transitory computer-readable medium described above may further include processes, features, means, or instructions for selecting a SIM card of a plurality of SIM cards of the first UE based at least in part on the set of subscription parameters for the second UE and a set of subscription parameters for the first UE, wherein communication with the second UE may be performed using the selected SIM card.

In some examples of the method, apparatus, and non-transitory computer-readable medium described above, the SIM card may be selected according to a SIM card pairing between at least one SIM of the first UE and at least on SIM of the second UE.

In some examples of the method, apparatus, and non-transitory computer-readable medium described above, identifying the set of subscription parameters comprises: identifying subscription information of the second UE that may be shared by the second UE.

In some examples of the method, apparatus, and non-transitory computer-readable medium described above, the SIM to use for communication with the second UE may be determined based on a quality of service parameter or a cost parameter.

In some examples of the method, apparatus, and non-transitory computer-readable medium described above, the set of subscription parameters for the second UE may be selected using a configurable GUI of the second UE.

In some examples of the method, apparatus, and non-transitory computer-readable medium described above, the set of subscription parameters comprises an application specific parameter, a contact specific parameter, an operating condition parameter, or a combination thereof associated with the second UE.

A method of wireless communication is described. The method may include specifying, by a first UE, a set of subscription parameters to be shared with a second UE, indicating, to the second UE, the set of subscription parameters, and communicating with the second UE based at least in part on the set of subscription parameters shared with the second UE.

An apparatus for wireless communication is described. The apparatus may include means for specifying, by a first UE, a set of subscription parameters to be shared with a second UE, means for indicating, to the second UE, the set of subscription parameters, and means for communicating with the second UE based at least in part on the set of subscription parameters shared with the second UE.

Another apparatus for wireless communication is described. The apparatus may include a processor, memory in electronic communication with the processor, and instructions stored in the memory. The instructions may be operable to cause the processor to specify, by a first UE, a set of subscription parameters to be shared with a second UE, indicate, to the second UE, the set of subscription parameters, and communicate with the second UE based at least in part on the set of subscription parameters shared with the second UE.

A non-transitory computer readable medium for wireless communication is described. The non-transitory computer-readable medium may include instructions operable to cause a processor to specify, by a first UE, a set of subscription parameters to be shared with a second UE, indicate, to the second UE, the set of subscription parameters, and communicate with the second UE based at least in part on the set of subscription parameters shared with the second UE.

In some examples of the method, apparatus, and non-transitory computer-readable medium described above, specifying the set of subscription parameters comprises: selecting, by the first UE, subscription information to be shared with the second UE using a configurable GUI.

In some examples of the method, apparatus, and non-transitory computer-readable medium described above, the subscription information may be associated with one or more SIMs of the first UE.

Some examples of the method, apparatus, and non-transitory computer-readable medium described above may further include processes, features, means, or instructions for receiving, from the second UE, a request for subscription information for one or more SIM cards of the first UE, wherein the set of subscription parameters may be indicated to the second UE in response to the request.

In some examples of the method, apparatus, and non-transitory computer-readable medium described above, indicating the set of subscription parameters comprises: transmitting, to the second UE, the set of subscription parameters in response to the request.

In some examples of the method, apparatus, and non-transitory computer-readable medium described above, the set of subscription parameters comprises a signal quality parameter, a roaming parameter, an operator parameter, or a combination thereof.

In some examples of the method, apparatus, and non-transitory computer-readable medium described above, the set of subscription parameters comprises an application specific parameter, a contact specific parameter, an operating condition parameter, or a combination thereof associated with the first UE.

A method of wireless communication is described. The method may include identifying, by a first UE, a set of connectivity preferences for a second UE, determining, based at least in part on the set of connectivity preferences for the second UE, a network protocol to use for communication with the second UE, and communicating with the second UE according to the determined network protocol.

An apparatus for wireless communication is described. The apparatus may include means for identifying, by a first UE, a set of connectivity preferences for a second UE, means for determining, based at least in part on the set of connectivity preferences for the second UE, a network protocol to use for communication with the second UE, and means for communicating with the second UE according to the determined network protocol.

Another apparatus for wireless communication is described. The apparatus may include a processor, memory in electronic communication with the processor, and instructions stored in the memory. The instructions may be operable to cause the processor to identify, by a first UE, a set of connectivity preferences for a second UE, determine, based at least in part on the set of connectivity preferences for the second UE, a network protocol to use for communication with the second UE, and communicate with the second UE according to the determined network protocol.

A non-transitory computer readable medium for wireless communication is described. The non-transitory computer-readable medium may include instructions operable to cause a processor to identify, by a first UE, a set of connectivity preferences for a second UE, determine, based at least in part on the set of connectivity preferences for the second UE, a network protocol to use for communication with the second UE, and communicate with the second UE according to the determined network protocol.

In some examples of the method, apparatus, and non-transitory computer-readable medium described above, the network protocol indicates data calling via voice over Wi-Fi or voice over cellular data.

In some examples of the method, apparatus, and non-transitory computer-readable medium described above, communicating with the second UE comprises: initiating a data call with the second UE using an application based at least in part on an application specific parameter of the set of connectivity parameters for the second UE.

In some examples of the method, apparatus, and non-transitory computer-readable medium described above, communicating with the second UE comprises: initiating a data call with the second UE based at least in part on a contact parameter or a contact group parameter associated with the second UE.

In some examples of the method, apparatus, and non-transitory computer-readable medium described above, communicating with the second UE comprises: performing a call with the second UE based at least in part on an incoming call parameter or an outgoing call parameter associated with the second UE.

In some examples of the method, apparatus, and non-transitory computer-readable medium described above, the set of connectivity preferences comprises a network protocol preference for the second UE, an application preference for the second UE, a call type preference for the second UE, an operating condition for the second UE, or a combination thereof.

A method of wireless communication is described. The method may include specifying, by a first UE, a set of connectivity parameters to be shared with a second UE, indicating, to the second UE, the set of connectivity parameters, and communicating with the second UE according to a network protocol based at least in part on the set of connectivity parameters shared with the second UE.

An apparatus for wireless communication is described. The apparatus may include means for specifying, by a first UE, a set of connectivity parameters to be shared with a second UE, means for indicating, to the second UE, the set of connectivity parameters, and means for communicating with the second UE according to a network protocol based at least in part on the set of connectivity parameters shared with the second UE.

Another apparatus for wireless communication is described. The apparatus may include a processor, memory in electronic communication with the processor, and instructions stored in the memory. The instructions may be operable to cause the processor to specify, by a first UE, a set of connectivity parameters to be shared with a second UE, indicate, to the second UE, the set of connectivity parameters, and communicate with the second UE according to a network protocol based at least in part on the set of connectivity parameters shared with the second UE.

A non-transitory computer readable medium for wireless communication is described. The non-transitory computer-readable medium may include instructions operable to cause a processor to specify, by a first UE, a set of connectivity parameters to be shared with a second UE, indicate, to the second UE, the set of connectivity parameters, and communicate with the second UE according to a network protocol based at least in part on the set of connectivity parameters shared with the second UE.

In some examples of the method, apparatus, and non-transitory computer-readable medium described above, the network protocol indicates data calling via voice over Wi-Fi or voice over cellular data.

In some examples of the method, apparatus, and non-transitory computer-readable medium described above, specifying the set of connectivity parameters comprises: selecting, by the first UE, connectivity information to be shared with the second UE using a configurable GUI.

Some examples of the method, apparatus, and non-transitory computer-readable medium described above may further include processes, features, means, or instructions for receiving, from the second UE, a request for the set of connectivity parameters of the first UE, wherein the set of connectivity parameters may be indicated to the second UE in response to the request.

In some examples of the method, apparatus, and non-transitory computer-readable medium described above, indicating the set of connectivity parameters comprises: transmitting, to the second UE, the set of connectivity parameters in response to the request.

In some examples of the method, apparatus, and non-transitory computer-readable medium described above, communicating with the second UE comprises: performing a data call with the second UE based at least in part on an application specific parameter of the first UE, a contact specific parameter associated with the first UE, a radio access technology parameter of the first UE, an operating condition of the first UE, or a combination thereof.

In some examples of the method, apparatus, and non-transitory computer-readable medium described above, the operating condition of the first UE comprises a time or a location of the first UE.

In some examples of the method, apparatus, and non-transitory computer-readable medium described above, communicating with the second UE comprises: performing a call with the second UE based at least in part on an incoming call parameter or an outgoing call parameter associated with the first UE.

In some examples of the method, apparatus, and non-transitory computer-readable medium described above, the set of connectivity preferences comprises a network protocol preference for the first UE, an application preference for the first UE, a call type preference for the first UE, or a combination thereof.

DETAILED DESCRIPTION

Figure 1:
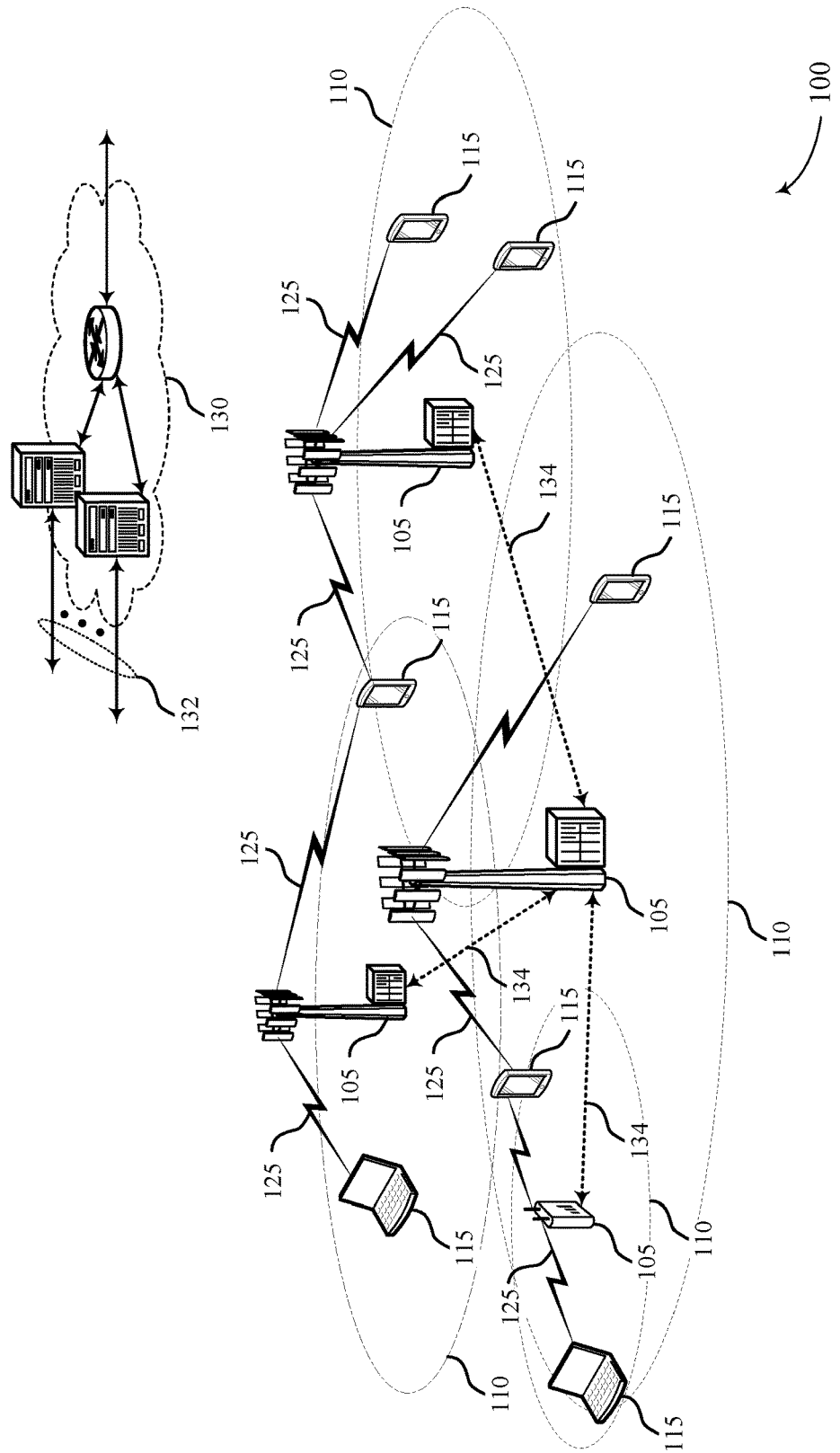
FIG. 1 illustrates an example of a system for wireless communication that supports techniques for using target information in wireless communications in accordance with aspects of the present disclosure.

A UE may support communication using multiple SIM cards and may selectively utilize any one of the multiple SIM cards when making calls to other UEs. For example, when making a call to a target UE, a source UE may determine to use a given SIM card based on a variety of factors such as channel quality, interference, coverage area, etc. (e.g., based on measurements or parameters from the source UE perspective). In some cases, a given SIM card may be selected by the source UE that leads to poor call quality at the target UE (e.g., if the selected SIM is experiencing interference at the target UE). The selection of a SIM card that is beneficial for the source UE but not the target UE may result in poor call performance, expensive calls, or dropped calls.

According to some aspects, a source UE may consider information at a target UE when determining which SIM card to use when making a call to the target UE. For example, the target UE may be a multi-SIM device, capable of using a first type of SIM card and a second type of SIM card. However, the target UE may have high signal quality using the first SIM, but low signal quality for the second SIM. The target UE may indicate the signal quality for each SIM to the source UE in subscription information, which may assist the source UE in determining which SIM card to use when calling the target UE. The subscription information may include a variety of information related to the target UE, such as subscriptions of the target UE, RAT information of the target UE, etc. The target UE may select which information to share with the source UE through a configurable GUI. Subscription information may be shared when contact information is exchanged, regularly synced across devices (e.g., as a background process), requested when initiating a call, or a combination thereof. The source UE may receive the subscription information and determine a SIM card to use based on the subscription information. In some examples, the source UE may determine which SIM card to use based on a combination of source UE subscription information and target UE subscription information. In some examples, the user may be prompted to select a SIM card based on subscription information of the target UE. In another example, the subscription information may include call cost and signal quality, among other factors, for one or both of the target UE and the source UE. The source UE may determine a SIM card to use for the target UE as well as for the source UE (e.g., select its own SIM card if the source UE is a multi-SIM device).

Additionally or alternatively, a UE may configure settings for whether to receive or reject data calls. The target UE may configure whether to receive data calls based on a set of connectivity parameters, such as RAT preferences or contact information preferences (e.g., a data call block list). In some cases, the target UE may be configured to receive data calls from the source UE when certain RATs are available. In some other examples, the target UE may be configured to receive data calls from specified contacts (e.g., in an address book of the target UE) and otherwise reject the data call. In some cases, the target UE may receive data calls based on the application used to receive the data call. For example, the target UE may be configured to receive data calls for a first application, whereas data calls may be disabled for a second application. The target UE may also be configured to receive data calls based on the current time (e.g., configured to receive data calls within a specified window of time) or current location. The target UE may be able to configure data call settings for a set of settings, such as enabling data calls for specific users on specific applications, among other combinations.

Aspects of the disclosure are initially described in the context of a wireless communications system. Example process flows and GUIs of a wireless device are illustrated, using which the wireless device may select network connectivity parameters or subscription parameters to share with other wireless devices. Aspects of the disclosure are further illustrated by and described with reference to apparatus diagrams, system diagrams, and flowcharts that relate to techniques for using target information in wireless communications.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be an LTE network, an LTE-A network, or an NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like. UEs 115 as described herein may be described a source UE 115 or a target UE 115. The source UE 115 may initiate a call with a target UE 115.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

Wireless communications system 100 may support techniques for using target information in wireless communications. A target UE 115 as described herein may be a multi-SIM device, where one of the multiple SIMs is beneficial, preferred, or configured to be used over other SIMs. The target UE 115 may indicate subscription information related to the multiple SIMs to the source UE 115. The source UE 115 may use the subscription information for the SIMs to determine a SIM card to use when calling the target UE 115. In some other examples, the target UE 115 may set connectivity preferences for receiving or rejecting data calls from the source UE 115. For example, the target UE 115 may set connectivity preferences based on the contact information of the source UE 115, applications used to make the data call, time, location, or other settings.

Figure 2:
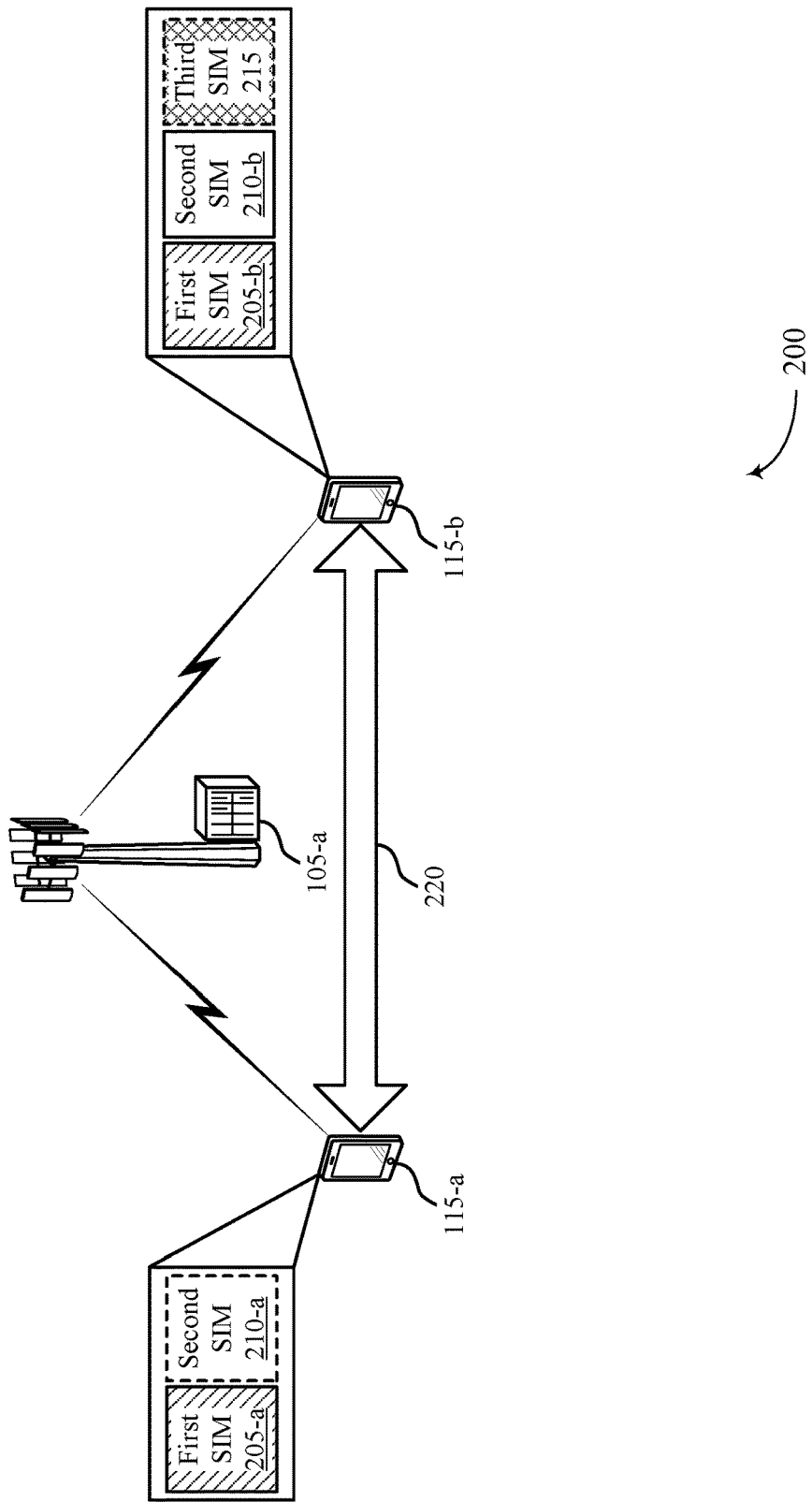
FIG. 2 illustrates an example of a wireless communications system that supports techniques for using target information in wireless communications in accordance with aspects of the present disclosure.

FIG. 2 illustrates an example of a wireless communications system 200 that supports techniques for using target information in wireless communications in accordance with various aspects of the present disclosure. In some examples, wireless communications system 200 may implement aspects of wireless communication system 100. Wireless communications system 200 may include UE 115-a and UE 115-b, which may be examples of UEs 115 as described herein. Wireless communications system 200 may also include base station 105-a, which may be an example of a base station 105 as described herein.

UE 115-*a* and UE 115-*b* may support wireless communication using multiple SIM cards. For example, UE 115-*a* may be capable of using a first SIM 205-*a* and optionally may include a second SIM 210-*a*. UE 115-*b* may be a multi-SIM device, capable of using the first SIM 205-*b* and a second SIM 210-*b*. In some examples, UE 115-*b* may be capable of using multiple other SIM cards such as a third SIM 215. In some examples, UE 115-*a* may be a single-SIM device capable of using either the first SIM 205 or the second SIM 210. In some other examples, UE 115-*a* may also be a multi-SIM device and able to use the first SIM 205 and the second SIM 210.

UE 115-*a* and UE 115-*b* may selectively utilize any one of the multiple SIM cards when making calls. For example, when making a call to UE 115-*b*, UE 115-*a* may determine which SIM card to use based on a variety of factors such as channel quality, interference, coverage area, etc. In some wireless systems, factors considered by a source UE 115 may only be from one perspective (e.g., the source perspective) and in some cases, a given SIM card may be selected by the source UE 115 that leads to poor call quality at the target UE 115. Considering only factors at the source perspective may result in poor call performance, expensive calls, or even dropped calls.

When determining a SIM card to use for making a call to UE 115-*b*, UE 115-*a* may also consider information of UE 115-*b* (e.g., the target UE 115). For example, UE 115-*b* may have high signal quality using a first SIM card (e.g., SIM 205-*b*), but poor signal quality using a second SIM card (e.g., SIM 210-*b*). In such cases, UE 115-*b* may indicate (e.g., within subscription parameters) that calling the first SIM 205-*b* may lead to poor call quality. Based on the received subscription parameters, UE 115-*a* may call the second SIM 210-*b* of UE 115-*b*. In some examples, UE 115-*a* may use any one of its SIM cards (SIM 205-*a* or SIM 210-*a*) when calling the second SIM 210-*b* of UE 115-*b*. In some other examples, UE 115-*a* may also select which SIM card to use when making the call based on the received subscription information.

The subscription information may include a number of subscription parameters related to a variety of information of UE 115-*b*. In some examples, subscription information and subscription parameters may be used interchangeably. For example, the subscription information may be related to subscriptions of UE 115-*b*, RAT information of UE 115-*b*, etc. In some examples, the subscription information may include information related to call quality, signal strength, roaming, geographical locations, preferred time ranges, data usage, cost of using a SIM card, processor usage, available RATs, contact information, or available software applications, among others. UE 115-*b* may select which information to share with UE 115-*a*. For example, UE 115-*b* may display the subscription parameters options on a configurable GUI, and a user of UE 115-*b* may select the shared subscription parameters through the GUI.

Subscription information may be shared over the wireless network (e.g., when contact information is exchanged) or, in some examples, the subscription information may be regularly synced (e.g., as a background process or when initiating a call). For example, UE 115-*a* and UE 115-*b* may exchange subscription information over a communication link 220. As an example, UE 115-*a* may request subscription information from UE 115-*b*, and UE 115-*b* may send the subscription information in response (e.g., over an available RAT). In some examples, the communication link 220 may be supported by base station 105-*a* or another network entity. In some other examples, the communication link 220 may be a direct connection between the UEs 115. In some examples, the communication link 220 may be formed by an access point (e.g., for Wi-Fi communications), or another intermediary network node.

UE 115-*a* may receive the subscription information and, based on this information, determine which SIM card to call, which SIM card to use, or both. UE 115-*a* may also determine which SIM card to use based on a combination of its own subscription information and the subscription information of UE 115-*b*. In some examples, the user of UE 115-*a* may be prompted to select a SIM card based on subscription information of UE 115-*b*. In another example, the subscription information may include call cost and signal quality, among other factors, for one or both of UE 115-*a* and UE 115-*b*.

In some aspects, UE 115-*b* may have poor signal quality for a subscription service related to the first SIM 205-*b* but high signal quality for a subscription service related to the second SIM 210-*b*. For example, the first SIM 205-*b* may be out of range of any base station 105 supporting the first subscription service, or UE 115-*b* may be in an area with high interference for the first subscription service. UE 115-*b* may transmit to UE 115-*a* (e.g., by the communication link 220) subscription parameters, which may indicate the poor quality for first SIM 205-*b* or the first subscription service. Thus, UE 115-*a* may call second SIM 210-*b*, or the number associated with second SIM 210-*b*, based on the received subscription information.

In another example, UE 115-*b* may be roaming on a subscription service associated with one of its SIM cards, such as the second SIM 210-*b*. Thus, calls to second SIM 210-*b* may be costly for one or more of the users. UE 115-*b* may indicate to UE 115-*a* through subscription information that second SIM 210-*b* is roaming. In some examples, the subscription information may include a cost associated with calling the roaming SIM card and cost associated with calling any non-roaming SIM cards. UE 115-*a* may select which SIM card to call based on the subscription information. For example, UE 115-*a* may call first SIM 205-*b* to avoid roaming charges for calling second SIM 210-*b*.

In another example, the first SIM 205 may be associated with a first operator, and the second SIM 210 may be associated with a second operator. UE 115-*b* may indicate to UE 115-*a* the available SIM cards and operator information in subscription parameters. In some examples, UE 115-*a* may be a single SIM device, but UE 115-*a* and UE 115-*b* may share a common operator. In some examples, using the same operator may provide benefits such as improved signal quality or reduce cost. UE 115-*a* may determine to call first SIM 205-*b* based on being able to use SIM cards of a common operator.

In another example, UE 115-*b* may be configured to prefer using second SIM 210-*b* over first SIM 205-*b*, regardless of performance benefits or cost benefits. For example, first SIM 210-*a* may be associated with a professional or work number, and UE 115-*b* may indicate a preference to take personal calls using second SIM 210-*b*. UE 115-*b* may indicate the preferences in subscription parameters and transmit the subscription parameters to UE 115-*a*. UE 115-*a* may determine to call second SIM 210-*b* when calling UE 115-*a* based on the indicated preferences in the subscription parameters.

In some other examples, UE 115-*b* may identify a preferred SIM card for specific users. For example, UE 115-*b* may prefer to use first SIM 205-*b* for UEs 115 associated with a first contact and to use second SIM 210-*b* for UEs 115 associated with a second contact. Additionally, or alternatively, UE 115-*b* may identify a preferred SIM card for groups of contacts. For examples, UE 115-*b* may prefer to use first SIM 205-*b* for contacts associated with work and to use second SIM 210-*b* for contacts associated with friends or family. UE 115-*b* may indicate the preferences to UE 115-*a* in the subscription parameters, and UE 115-*a* may select a SIM card to call when calling UE 115-*b* based on the indicated preferences.

UE 115-*b* may indicate subscription parameters to UE 115-*a* including a combination of any number of settings. For example, UE 115-*b* may include SIM card information related to one or more of call quality, roaming, location, time, cost, user contacts, groups of user contacts, available operators, and personal preference, among others. UE 115-*a* may select a SIM card to call, a SIM card to use when calling, or both, when making a call to UE 115-*b*.

Additionally or alternatively, UE 115-*b* may configure settings for receiving or rejecting, or blocking, data calls. For example, UE 115-*b* may determine whether to receive data calls based on a set of connectivity parameters, such as RAT preferences or contact information preferences. The user of UE 115-*b* may configure the settings through a GUI on the UE 115-*b*. For example, there may be additional options in a settings menu for contacts or applications where UE 115-*b* may configure options for receiving data calls. For example, UE 115-*b* may specify data calling preferences for specific applications, specific users, or preferences for specific users while using specific applications.

In some examples, UE 115-*b* may configure data call settings based on RAT availability or network availability. For example, UE 115-*b* may turn off data call reception while disconnected from a network such as Wi-Fi. In some examples, UE 115-*b* may indicate a set of connectivity parameters to UE 115-*a*, which may include the preference for rejecting data calls when disconnected from Wi-Fi. Thus, UE 115-*a* may be unable to make data calls to UE 115-*b* based on the connectivity parameters. For example, UE 115-*a* may indicate to the user of UE 115-*a* that data calls with UE 115-*b* are disabled. In some examples, a network protocol may indicate whether UE 115-*a* may make a data call to UE 115-*b* over cellular data or Wi-Fi. In some examples, UE 115-*b* may selectively configure contacts to accept or reject data calls based on RAT availability or network configurations. For example, while disconnected from Wi-Fi, UE 115-*b* may accept data calls from a first UE 115 associated with a first contact, but reject data calls from a second UE 115 associated with a second contact.

In some examples, UE 115-*b* may configure data call settings for specific applications. For example, UE 115-*b* may set preferences to reject or block data calls for a first application, and allow data calls for a second application. In some other examples, UE 115-*a* may allow data calls when connected to Wi-Fi for the first application, and allow or block data calls at any time for the second application. These preferences may be indicated in connectivity parameters to UE 115-*a*, and UE 115-*a* may select an application to make the data call based on the preferences. In some examples, UE 115-*a* may be blocked from making data calls using the first application, but may be able to make data calls using the second application.

In another example, UE 115-*b* may select which contacts may be able to make data calls. For example, UE 115-*b* may select whether the contact information associated with the user of UE 115-*a* can make data calls to UE 115-*b*. If UE 115-*b* blocks UE 115-*a* from making data calls, UE 115-*a* may receive an indication (e.g., displayed on a GUI of UE 115-*a*) that data calls are unavailable. In some examples, UE 115-*b* may select that the user of UE 115-*a* (e.g., based on the contact information of that user) may make data calls when UE 115-*b* is connected to Wi-Fi, but not when UE 115-*b* is disconnected from Wi-Fi. Contact information may include a name, phone number, e-mail address, paging number, local address, social media handle or username, etc.

In some other examples, UE 115-*b* may set data call preferences for groups of users. For example, UE 115-*b* may block data calls from any users except for users of a specific group of contacts. For example, UE 115-*b* may accept data calls from UEs 115 associated with a group of family members or close friends, but reject or block data calls from UEs 115 not associated with the group.

In some other examples, UE 115-*b* may set preferences for data calls based on time and location. For example, UE 115-*b* may block data calls during a time window. In another example, UE 115-*b* may block data calls based on its current location, such as if UE 115-*b* is at a location associated with work, or a location where data usage may be expensive.

UE 115-*b* may set preferences for any number of settings or combinations of the settings. For example, UE 115-*b* may set preferences for one or more of user contact, groups of contacts, time, location, applications, RAT connections (e.g., connected to Wi-Fi), call quality, previous data usage, data rates, among others.

Figure 3:
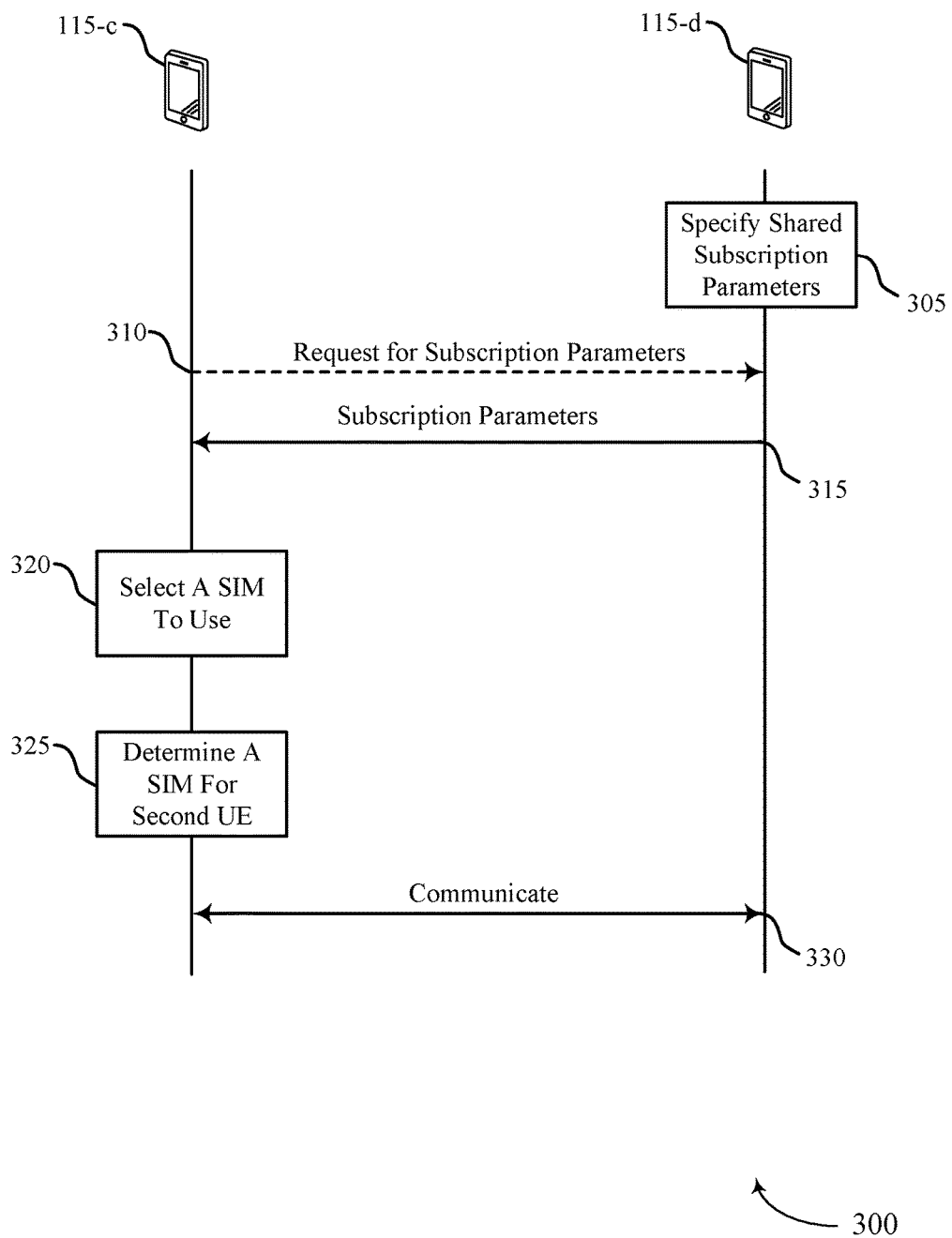
FIG. 3 illustrates an example of a process flow that supports techniques for using target information in wireless communications in accordance with aspects of the present disclosure.

FIG. 3 illustrates an example of a process flow 300 that supports techniques for using target information in wireless communications in accordance with various aspects of the present disclosure. In some examples, process flow 300 may implement aspects of wireless communication system 100. Process flow 300 may include UE 115-*c* and UE 115-*d*, which may be examples of UEs 115 as described herein. In some examples, UE 115-*c* and UE 115-*d* may communicate through a base station 105 as described herein. Additionally, or alternatively, UE 115-*c* and UE 115-*d* may communicate by an access point, such as for Wi-Fi communications. In some other examples, UE 115-*c* and UE 115-*d* may communicate directly, for example by D2D communications.

At 305, UE 115-*d* may specify which subscription information to share with other UEs 115. For example, UE 115-*d* may specify a set of subscription parameters to be shared with UE 115-*c*. In some examples, UE 115-*d* may select subscription information to be shared with UE 115-*c* using a configurable GUI. In some examples, the subscription information may be associated with one or more SIMs of UE 115-*c*.

In some examples, UE 115-*c* may optionally transmit a request for subscription parameters for one or more SIM cards of UE 115-*d* at 310. The request may be transmitted directly from UE 115-*c* to UE 115-*d* or may be requested indirectly through a base station. The request may be performed during a call or connection setup or during a synchronization process.

At 315, UE 115-*d* may indicate the set of subscription parameters. In some examples, UE 115-*d* may transmit the set of subscription parameters in response to the request. The set of subscription parameters may include those specified at 305. The subscription parameters may include various information related to UE 115-*d*. For example, the subscription parameters may include information as described herein. In some examples, UE 115-*c* may identify subscription information specifically for UE 115-*d* or a contact associated with UE 115-*d*. In some examples, the subscription parameters may include a quality of service parameter or a cost parameter. In some cases, the set of subscription parameters may include an application specific parameter, a contact specific parameter, an operating condition parameter, or a combination thereof associated with UE 115-*d*.

At 320, UE 115-c may select a SIM to use for communicating with UE 115-d (e.g., UE 115-c selects one of its own SIM cards). In some examples, UE 115-c selecting the SIM card may be based on the set of subscription parameters for UE 115-d and a set of subscription parameters for UE 115-c. In some examples, UE 115-c may select a SIM card of multiple SIM cards (e.g., where UE 115-c is a multi-SIM device), or UE 115-c may select the only available SIM card (e.g., where UE 115-c is a single-SIM device).

At 325, UE 115-c may determine a SIM to use for communication with UE 115-d (e.g., a SIM of UE 115-d) based on the set of subscription parameters for UE 115-d. In some examples, the SIM may be determined based on a quality of service parameter or a cost parameter.

At 330, UE 115-c and UE 115-d may communicate using the determined SIM and the selected SIM.

Figure 4:
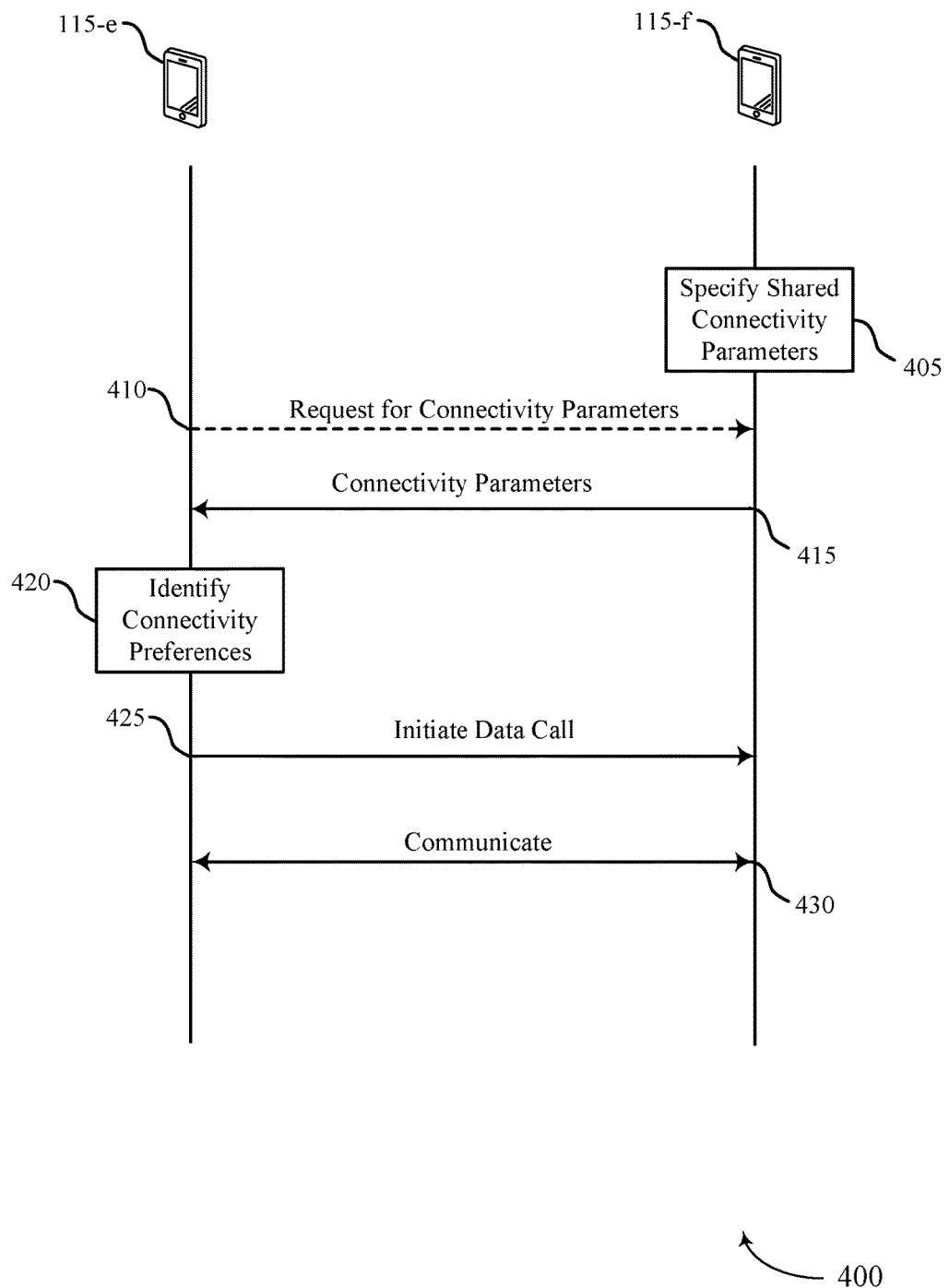
FIG. 4 illustrates an example of a process flow that supports techniques for using target information in wireless communications in accordance with aspects of the present disclosure.

FIG. 4 illustrates an example of a process flow 400 that supports techniques for using target information in wireless communications in accordance with various aspects of the present disclosure. In some examples, process flow 400 may implement aspects of wireless communication system 100. Process flow 400 may include UE 115-e and UE 115-f, which may be examples of UEs 115 as described herein. In some examples, UE 115-e and UE 115-f may communicate via a base station 105 as described herein. Additionally, or alternatively, UE 115-e and UE 115-f may communicate by an access point, such as for Wi-Fi communications. In some other examples, UE 115-e and UE 115-f may communicate directly, for example by D2D communications.

At 405, UE 115-f may specify which connectivity information to share with other UEs 115. For example, UE 115-f may specify a set of connectivity parameters to be shared with UE 115-e. In some examples, UE 115-f may select connectivity information to be shared with UE 115-e using a configurable GUI.

In some examples, UE 115-e may optionally transmit a request for the set of connectivity parameters at 410. The request may be transmitted directly from UE 115-e to UE 115-f or may be requested indirectly through a base station. The request may be performed during a call or connection setup or during a synchronization process.

At 415, UE 115-f may indicate the set of connectivity parameters to UE 115-e. For example, UE 115-f may transmit, to UE 115-e, the set of connectivity parameters in response to the request. In some examples, the connectivity parameters may include a network protocol preference for UE 115-f, an application preference for UE 115-f, a call type preference for UE 115-f, an operating condition for UE 115-f, or a combination thereof.

At 420, UE 115-e may identify the set of connectivity parameters for UE 115-f UE 115-e may determine, based on the set of connectivity preferences for UE 115-f, a network protocol to use for communication with UE 115-f. In some examples, the network protocol includes a voice over internet protocol or voice over Wi-Fi. In some cases, UE 115-f may select whether to receive a data call (e.g., packet-based calls such as voice over internet protocol calls or voice over Wi-Fi calls) using cellular data or using Wi-Fi based on the network protocol.

At 425, UE 115-e may initiate a data call with UE 115-f For example, UE 115-e may initiate a data call with UE 115-f using an application based on the application specific parameter of the set of connectivity parameters for UE 115-f In some other examples, UE 115-e may initiate the data call with UE 115-f based on a contact parameter or a contact group parameters associated with UE 115-f.

At 430, UE 115-e may communicate with UE 115-f according to the determined network protocol. UE 115-e may perform a call with UE 115-f based on an incoming call parameter or an outgoing call parameter associated with UE 115-f In some examples, UE 115-e and UE 115-f may perform a data call.

Figure 5:
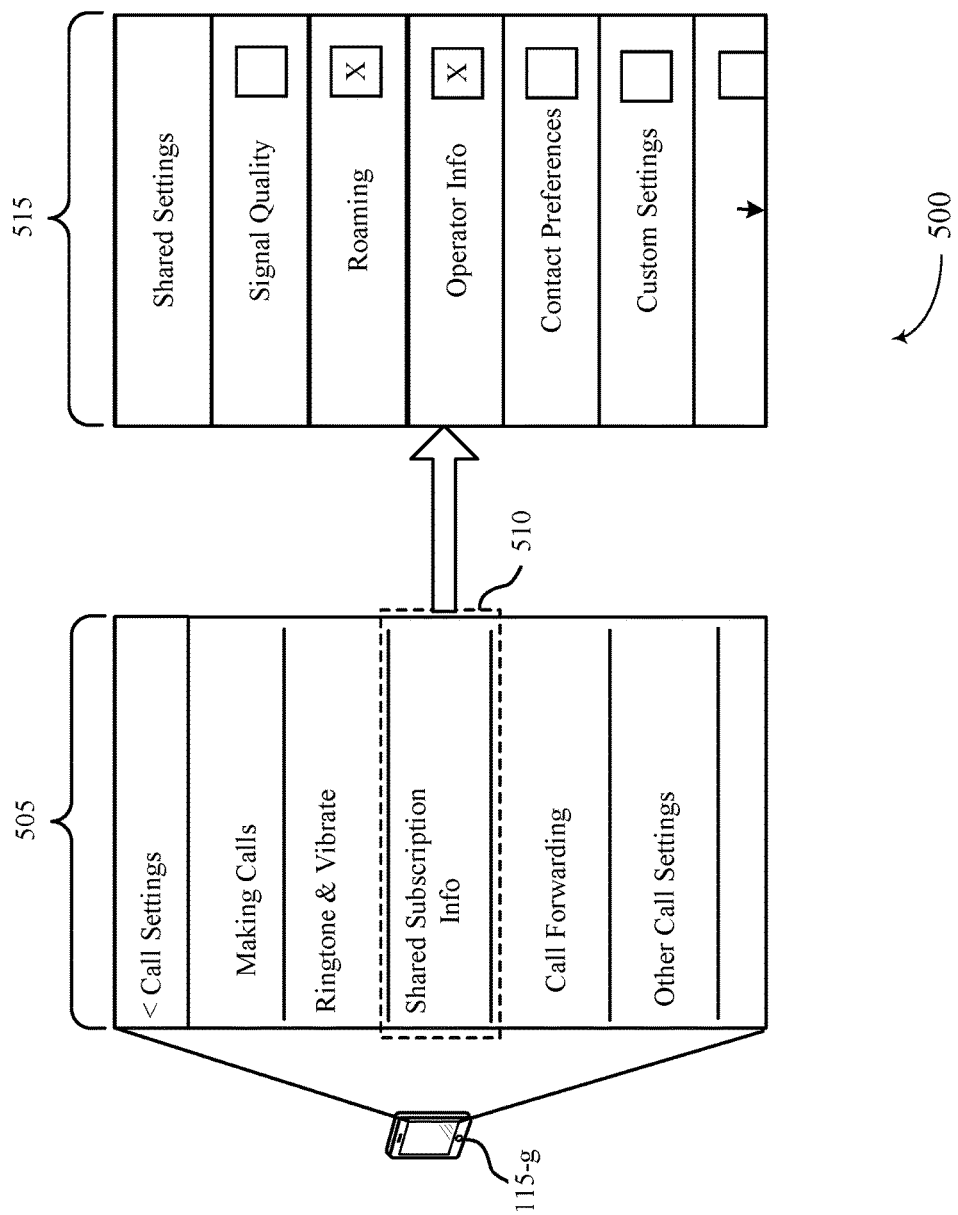
FIG. 5 illustrates an example of a SIM selection GUI that supports techniques for using target information in wireless communications in accordance with aspects of the present disclosure.

FIG. 5 illustrates an example of a GUI 500 that supports techniques for using target information in wireless communications in accordance with various aspects of the present disclosure. In some examples, GUI 500 may implement aspects of wireless communication system 100. GUI 500 may be operable using UE 115-g, which may be an example of a UE 115 as described herein. UE 115-g may configure which subscription parameters to share with other UEs 115, such that the other UEs 115 may select SIMs to use for communication with UE 115-g.

Call settings GUI 505 may display various options for configuring call settings. For example, UE 115-g may be able to configure settings for making calls, a ringtone and vibration for incoming calls, call forwarding, or various other call settings. The call settings GUI 505 may have a shared subscription information option 510 for configuring settings related to shared subscription information.

Upon selecting the shared subscription information option 510, UE 115-h may display a shared subscription settings GUI 515. The shared subscription settings GUI 515 may include a number of configurable settings for sharing subscription settings with other UEs 115. For example, UE 115-g may select whether to share information related to signal quality, roaming, usable operators, contact preferences, custom settings, or other settings as described herein. UE 115-g may select a set of the subscription parameters to share with other UEs 115.

Figure 6:
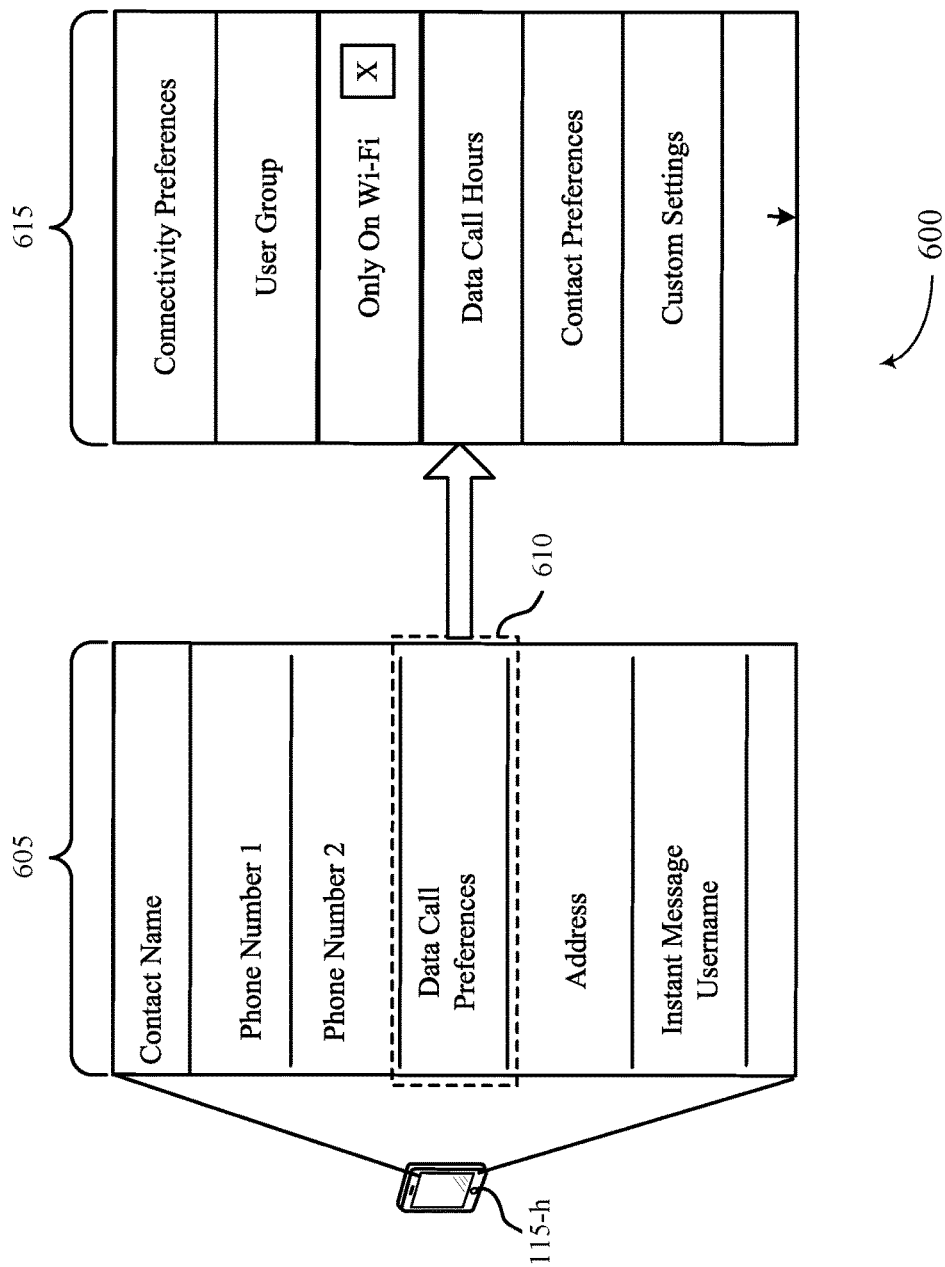
FIG. 6 illustrates an example of a data call preferences GUI that supports techniques for using target information in wireless communications in accordance with aspects of the present disclosure.

FIG. 6 illustrates an example of a GUI 600 that supports techniques for using target information in wireless communications in accordance with various aspects of the present disclosure. In some examples, GUI 600 may implement aspects of wireless communication system 100. GUI 600 may be operable using UE 115-h, which may be an example of a UE 115 as described herein. UE 115-h may configure connectivity preferences to share with other UEs 115, such that the other UEs 115 may call UE 115-h according to the configured connectivity preferences.

Contact GUI 605 may display contact information and settings for a contact of UE 115-h. For example, the contact GUI 605 may display a name of the contact, available phone numbers (e.g., corresponding to different SIMs), address, social media usernames or handles, nicknames, e-mail addresses, etc. The contact GUI 605 may have a data call preferences option 610 for configuring data call preferences for the contact.

Upon selecting the data call preferences option 610, UE 115-h may display a connectivity preferences GUI 615, which corresponds to the contact. The connectivity preferences GUI 615 may include a number of configurable settings for sharing connectivity preferences with UEs 115 related to the contact. For example, UE 115-g may select whether to receive data calls from UEs 115 associated with the user. In some examples, UE 115-h may select to receive data calls from the user when connected to Wi-Fi, and otherwise reject data calls. UE 115-h may select a group with which the user associated (e.g., work, friends, family, etc.) and configure settings for when data calls are available for that group (e.g., on Wi-Fi, never, or always, among others). In some examples, UE 115-h may select a window of time for receiving or rejecting data calls from the contact, or a number of other settings.

In some other examples, UE 115-*h* may be able to configure data call settings for specific applications. For example, UE 115-*h* may be turn off data calls for a first application, enable data calls anytime for a second application, and enable data calls when connected to Wi-Fi for a third application (e.g., for voice over Wi-Fi or a different voice over internet protocol). UE 115-*h* may be able to configure data call settings for the specific applications through the connectivity preferences GUI 615, a GUI for a specific application, or a general application GUI. In some examples, UE 115-*h* may be able to set any number of configurable combination of data call settings. For example, UE 115-*h* may set application settings for specific contacts, or vice versa, in combination with any other data call setting described.

Figure 7:
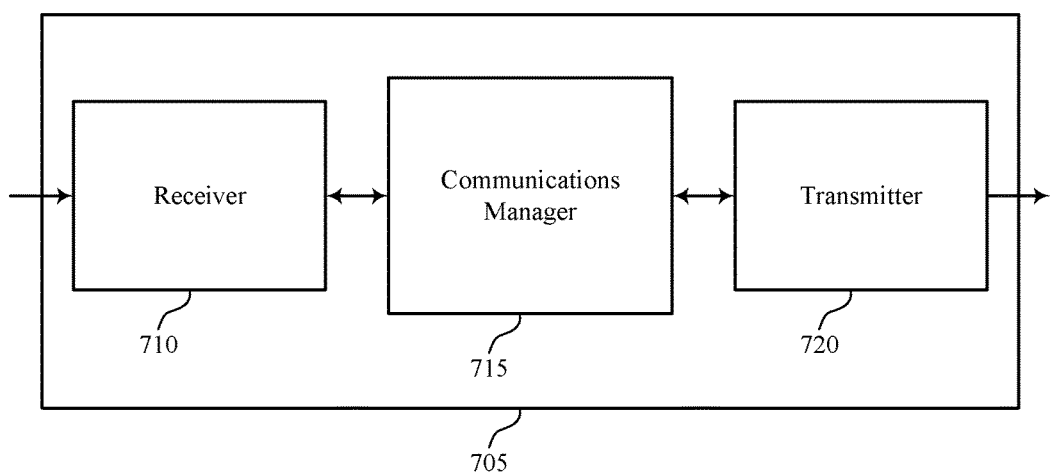
FIGS. 7 and 8 show diagrams of a device that supports techniques for using target information in wireless communications in accordance with aspects of the present disclosure.

FIG. 7 shows a diagram 700 of a wireless device 705 that supports techniques for using target information in wireless communications in accordance with aspects of the present disclosure. Wireless device 705 may be an example of aspects of a UE 115 as described herein. Wireless device 705 may include receiver 710, communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to techniques for using target information in wireless communications, etc.). Information may be passed on to other components of the device. The receiver 710 may be an example of aspects of the transceiver 935 described with reference to FIG. 9. The receiver 710 may utilize a single antenna or a set of antennas.

Communications manager 715 may be an example of aspects of the communications manager 915 described with reference to FIG. 9. Communications manager 715 and/or at least some of its various sub-components may be implemented in hardware, software executed by a processor, firmware, or any combination thereof. If implemented in software executed by a processor, the functions of the communications manager 715 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The communications manager 715 and/or at least some of its various sub-components may be physically located at various positions, including being distributed such that portions of functions are implemented at different physical locations by one or more physical devices. In some examples, communications manager 715 and/or at least some of its various sub-components may be a separate and distinct component in accordance with various aspects of the present disclosure. In other examples, communications manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Communications manager 715 may identify, by a first UE 115, a set of subscription parameters for a second UE 115, determine, based on the set of subscription parameters for the second UE 115, a SIM to use for communication with the second UE 115, and communicate with the second UE 115 using the determined SIM. The communications manager 715 may also specify, by a first UE 115, a set of subscription parameters to be shared with a second UE 115, indicate, to the second UE 115, the set of subscription parameters, and communicate with the second UE 115 based on the set of subscription parameters shared with the second UE. The communications manager 715 may also identify, by a first UE 115, a set of connectivity preferences for a second UE 115, determine, based on the set of connectivity preferences for the second UE 115, a network protocol to use for communication with the second UE 115, and communicate with the second UE 115 according to the determined network protocol. The communications manager 715 may also specify, by a first UE 115, a set of connectivity parameters to be shared with a second UE 115, indicate, to the second UE 115, the set of connectivity parameters, and communicate with the second UE 115 according to a network protocol based on the set of connectivity parameters shared with the second UE.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas.

Figure 8:
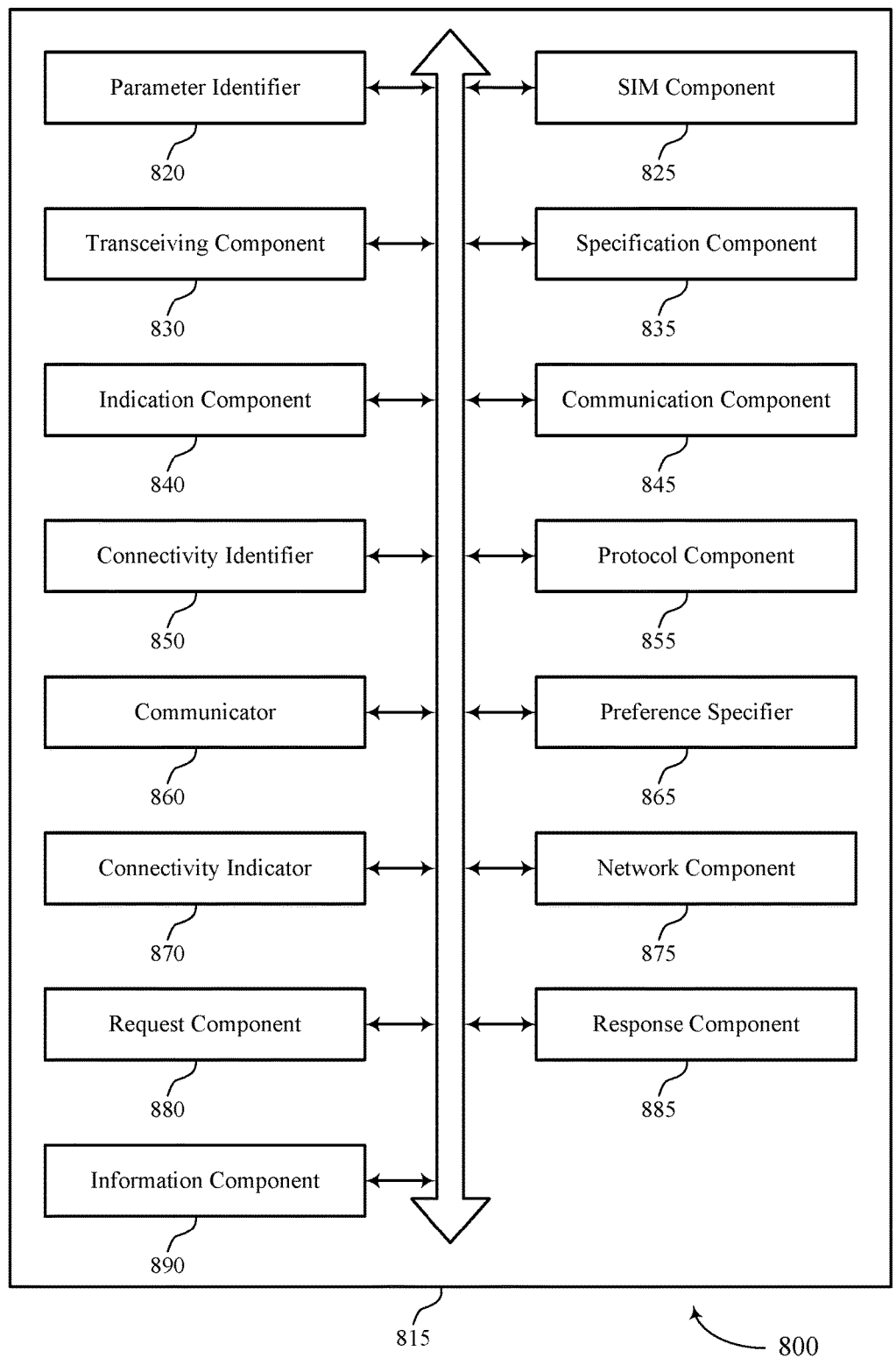

FIG. 8 shows a diagram 800 of a communications manager 815 that supports techniques for using target information in wireless communications in accordance with aspects of the present disclosure. The communications manager 815 may be an example of aspects of a communications manager 715, or a communications manager 915 described with reference to FIGS. 7 and 9. The communications manager 815 may include parameter identifier 820, SIM component 825, transceiving component 830, specification component 835, indication component 840, communication component 845, connectivity identifier 850, protocol component 855, communicator 860, preference specifier 865, connectivity indicator 870, network component 875, request component 880, response component 885, and information component 890. Each of these modules may communicate, directly or indirectly, with one another (e.g., via one or more buses).

Parameter identifier 820 may identify, by a first UE 115, a set of subscription parameters for a second UE. In some cases, identifying the set of subscription parameters includes identifying subscription information of the second UE 115 that is shared by the second UE. In some examples, the set of subscription parameters for the second UE 115 is selected using a configurable GUI of the second UE. In some aspects, the set of subscription parameters includes an application specific parameter, a contact specific parameter, an operating condition parameter, or a combination thereof associated with the second UE.

SIM component 825 may determine, based on the set of subscription parameters for the second UE 115, a SIM to use for communication with the second UE 115 and select a SIM card of a set of SIM cards of the first UE 115 based on the set of subscription parameters for the second UE 115 and a set of subscription parameters for the first UE 115, where communication with the second UE 115 is performed using the selected SIM card. In some cases, the SIM card is selected according to a SIM card pairing between at least one SIM of the first UE 115 and at least on SIM of the second UE. In some aspects, the SIM to use for communication with the second UE 115 is determined based on a quality of service parameter or a cost parameter.

Transceiving component 830 may communicate with the second UE 115 using the determined SIM.

Specification component 835 may specify, by a first UE 115, a set of subscription parameters to be shared with a second UE. In some cases, specifying the set of subscription parameters includes selecting, by the first UE 115, subscription information to be shared with the second UE 115 using a configurable GUI. In some aspects, the subscription information is associated with one or more SIMs of the first UE. In some examples, the set of subscription parameters includes a signal quality parameter, a roaming parameter, an operator parameter, or a combination thereof. In some instances, the set of subscription parameters includes an application specific parameter, a contact specific parameter, an operating condition parameter, or a combination thereof associated with the first UE.

Indication component 840 may indicate, to the second UE 115, the set of subscription parameters. In some cases, indicating the set of subscription parameters includes transmitting, to the second UE 115, the set of subscription parameters in response to the request.

Communication component 845 may communicate with the second UE 115 based on the set of subscription parameters shared with the second UE.

Connectivity identifier 850 may identify, by a first UE 115, a set of connectivity preferences for a second UE. In some cases, the set of connectivity preferences includes a network protocol preference for the second UE 115, an application preference for the second UE 115, a call type preference for the second UE 115, an operating condition for the second UE 115, or a combination thereof.

Protocol component 855 may determine, based on the set of connectivity preferences for the second UE 115, a network protocol to use for communication with the second UE. In some cases, the network protocol indicates data calling via voice over Wi-Fi or voice over cellular data.

Communicator 860 may communicate with the second UE 115 according to the determined network protocol. In some cases, communicating with the second UE 115 includes initiating a data call with the second UE 115 using an application based on an application specific parameter of the set of connectivity parameters for the second UE. In some aspects, communicating with the second UE 115 includes initiating a data call with the second UE 115 based on a contact parameter or a contact group parameter associated with the second UE. In some examples, communicating with the second UE 115 includes performing a call with the second UE 115 based on an incoming call parameter or an outgoing call parameter associated with the second UE.

Preference specifier 865 may specify, by a first UE 115, a set of connectivity parameters to be shared with a second UE. In some cases, specifying the set of connectivity parameters includes selecting, by the first UE 115, connectivity information to be shared with the second UE 115 using a configurable GUI. In some examples, the set of connectivity preferences includes a network protocol preference for the first UE 115, an application preference for the first UE 115, a call type preference for the first UE 115, or a combination thereof.

Connectivity indicator 870 may indicate, to the second UE 115, the set of connectivity parameters and receive, from the second UE 115, a request for the set of connectivity parameters of the first UE 115, where the set of connectivity parameters is indicated to the second UE 115 in response to the request. In some instances, indicating the set of connectivity parameters includes transmitting, to the second UE 115, the set of connectivity parameters in response to the request.

Network component 875 may communicate with the second UE 115 according to a network protocol based on the set of connectivity parameters shared with the second UE. In some cases, the network protocol indicates data calling via voice over Wi-Fi or voice over cellular data. In some cases, communicating with the second UE 115 includes performing a data call with the second UE 115 based on an application specific parameter of the first UE 115, a contact specific parameter associated with the first UE 115, a radio access technology parameter of the first UE 115, an operating condition of the first UE 115, or a combination thereof. In some aspects, the operating condition of the first UE 115 includes a time or a location of the first UE. In some examples, communicating with the second UE 115 includes performing a call with the second UE 115 based on an incoming call parameter or an outgoing call parameter associated with the first UE.

Request component 880 may transmit, to the second UE 115, a request for subscription parameters for one or more SIM cards of the second UE.

Response component 885 may receive, from the second UE 115, the subscription parameters for one or more SIM cards of the second UE 115 in response to the request, where the identified set of subscription parameters for the second UE 115 is based on the subscription parameters for one or more SIM cards of the second UE.

Information component 890 may receive, from the second UE 115, a request for subscription information for one or more SIM cards of the first UE 115, where the set of subscription parameters is indicated to the second UE 115 in response to the request.

Figure 9:
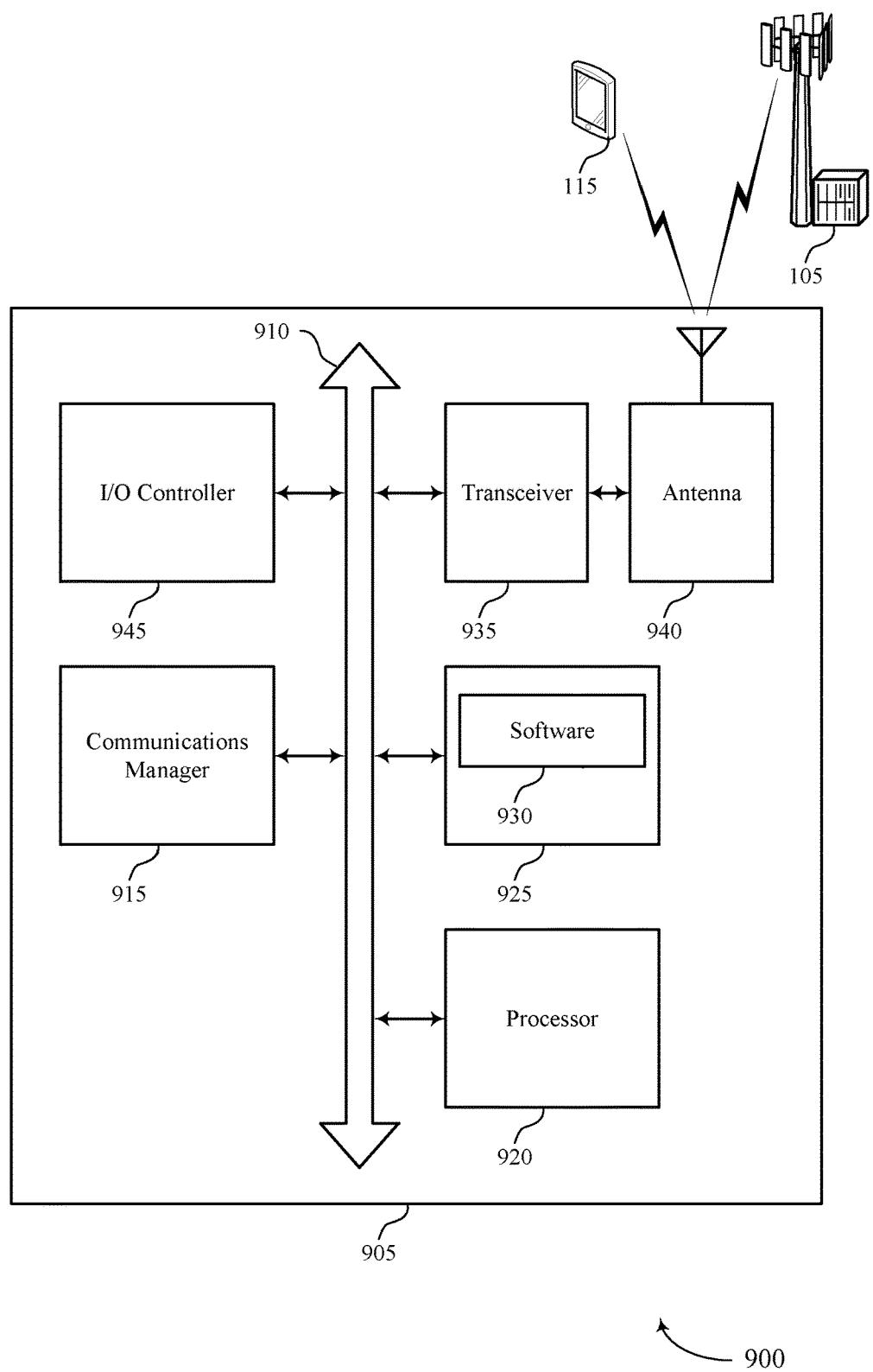
FIG. 9 illustrates a diagram of a system including a UE that supports techniques for using target information in wireless communications in accordance with aspects of the present disclosure.

FIG. 9 shows a diagram of a system 900 including a device 905 that supports techniques for using target information in wireless communications in accordance with aspects of the present disclosure. Device 905 may be an example of or include the components of wireless device 705, or a UE 115 as described above, e.g., with reference to FIG. 7. Device 905 may include components for bi-directional voice and data communications including components for transmitting and receiving communications, including communications manager 915, processor 920, memory 925, software 930, transceiver 935, antenna 940, and I/O controller 945. These components may be in electronic communication via one or more buses (e.g., bus 910). Device 905 may communicate wirelessly with one or more base stations 105.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting techniques for using target information in wireless communications).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware or software operation such as the interaction with peripheral components or devices.

Software 930 may include code to implement aspects of the present disclosure, including code to support techniques for using target information in wireless communications. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

Figure 10:
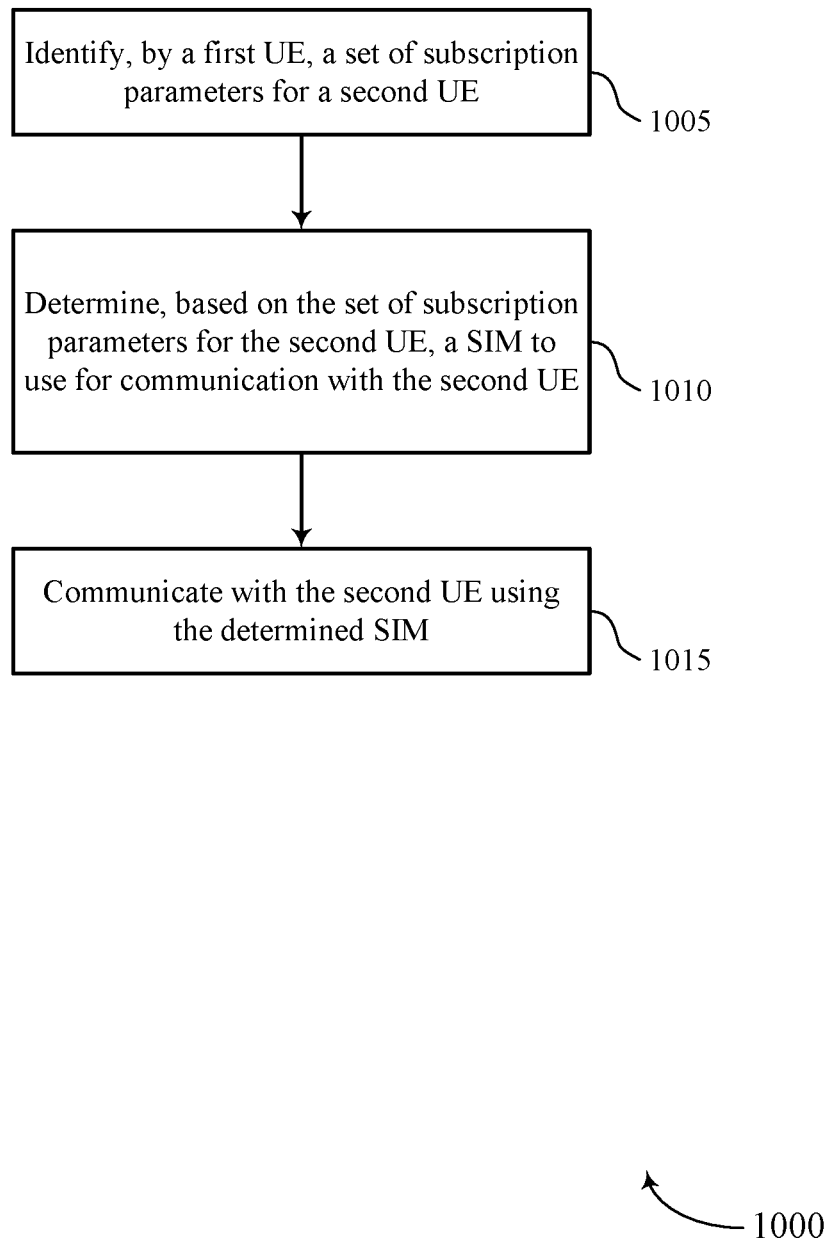
FIGS. 10 through 13 illustrate methods for techniques for using target information in wireless communications in accordance with aspects of the present disclosure.

FIG. 10 shows a flowchart illustrating a method 1000 for techniques for using target information in wireless communications in accordance with aspects of the present disclosure. The operations of method 1000 may be implemented by a UE 115 or its components as described herein. For example, the operations of method 1000 may be performed by a communications manager as described with reference to FIGS. 7 through 9. In some examples, a UE 115 may execute a set of codes to control the functional elements of the device to perform the functions described below. Additionally or alternatively, the UE 115 may perform aspects of the functions described below using special-purpose hardware.

At block 1005 the UE 115 may identify a set of subscription parameters for a second UE. The operations of block 1005 may be performed according to the methods described herein. In certain examples, aspects of the operations of block 1005 may be performed by a parameter identifier as described with reference to FIGS. 7 through 9.

At block 1010 the UE 115 may determine, based on the set of subscription parameters for the second UE 115, a SIM to use for communication with the second UE. The operations of block 1010 may be performed according to the methods described herein. In certain examples, aspects of the operations of block 1010 may be performed by a SIM component as described with reference to FIGS. 7 through 9.

At block 1015 the UE 115 may communicate with the second UE using the determined SIM. The operations of block 1015 may be performed according to the methods described herein. In certain examples, aspects of the operations of block 1015 may be performed by a transceiving component as described with reference to FIGS. 7 through 9.

Figure 11:
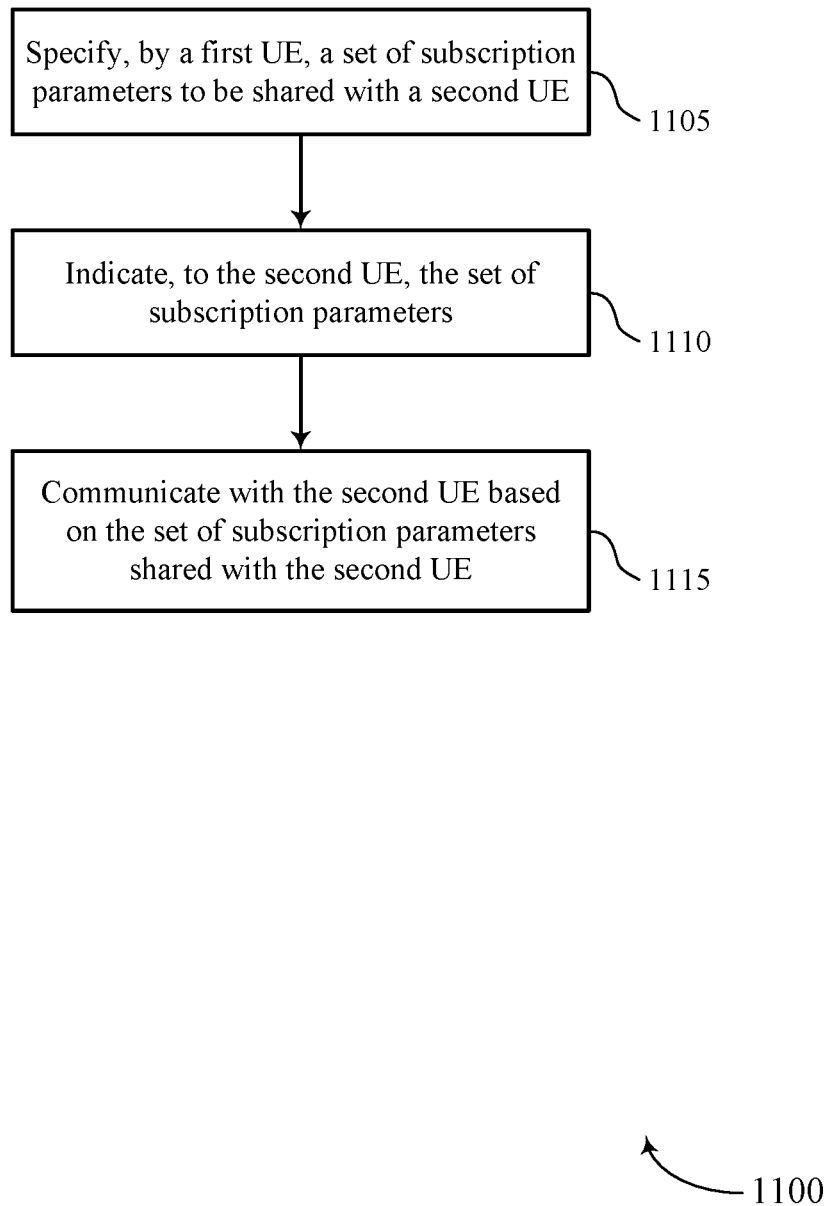

FIG. 11 shows a flowchart illustrating a method 1100 for techniques for using target information in wireless communications in accordance with aspects of the present disclosure. The operations of method 1100 may be implemented by a UE 115 or its components as described herein. For example, the operations of method 1100 may be performed by a communications manager as described with reference to FIGS. 7 through 9. In some examples, a UE 115 may execute a set of codes to control the functional elements of the device to perform the functions described below. Additionally or alternatively, the UE 115 may perform aspects of the functions described below using special-purpose hardware.

At block 1105 the UE 115 may specify a set of subscription parameters to be shared with a second UE. The operations of block 1105 may be performed according to the methods described herein. In certain examples, aspects of the operations of block 1105 may be performed by a specification component as described with reference to FIGS. 7 through 9.

At block 1110 the UE 115 may indicate, to the second UE 115, the set of subscription parameters. The operations of block 1110 may be performed according to the methods described herein. In certain examples, aspects of the operations of block 1110 may be performed by a indication component as described with reference to FIGS. 7 through 9.

At block 1115 the UE 115 may communicate with the second UE based on the set of subscription parameters shared with the second UE. The operations of block 1115 may be performed according to the methods described herein. In certain examples, aspects of the operations of block 1115 may be performed by a communication component as described with reference to FIGS. 7 through 9.

Figure 12:
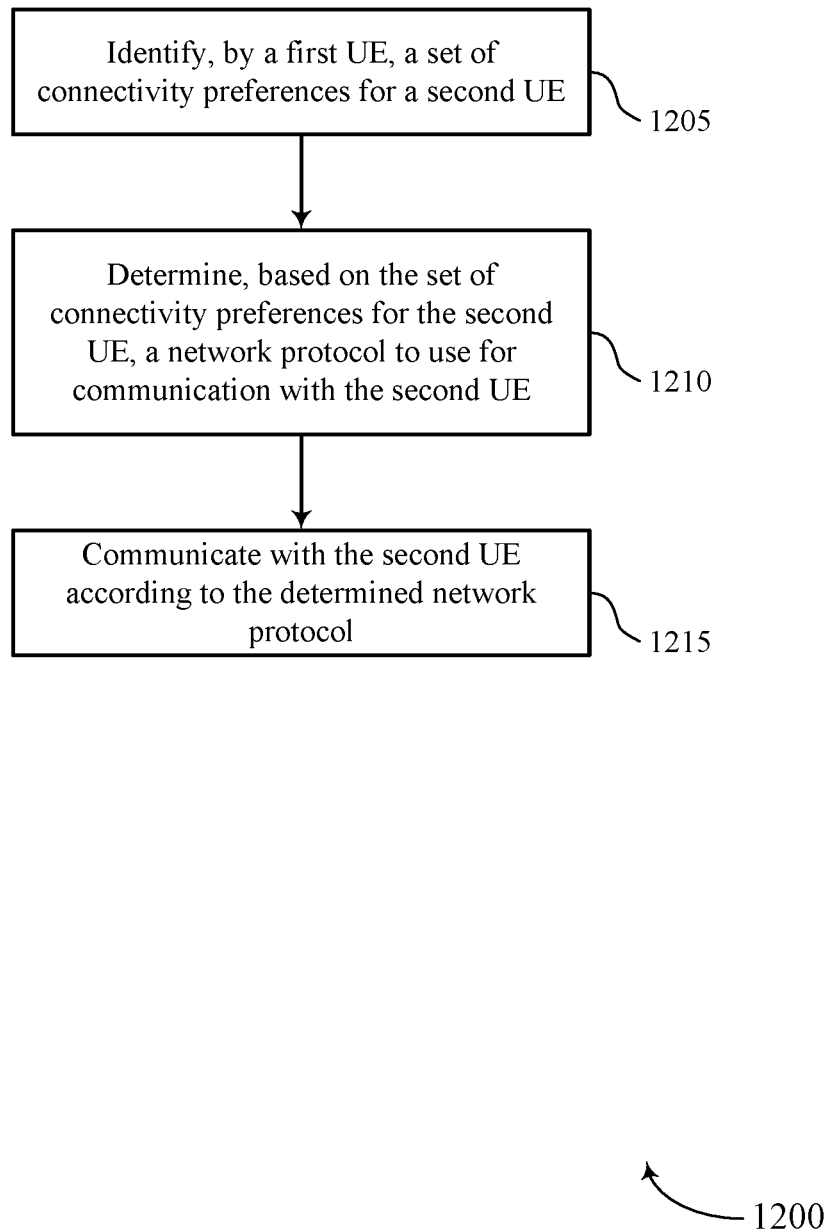

FIG. 12 shows a flowchart illustrating a method 1200 for techniques for using target information in wireless communications in accordance with aspects of the present disclosure. The operations of method 1200 may be implemented by a UE 115 or its components as described herein. For example, the operations of method 1200 may be performed by a communications manager as described with reference to FIGS. 7 through 9. In some examples, a UE 115 may execute a set of codes to control the functional elements of the device to perform the functions described below. Additionally or alternatively, the UE 115 may perform aspects of the functions described below using special-purpose hardware.

At block 1205 the UE 115 may identify a set of connectivity preferences for a second UE. The operations of block 1205 may be performed according to the methods described herein. In certain examples, aspects of the operations of block 1205 may be performed by a connectivity identifier as described with reference to FIGS. 7 through 9.

At block 1210 the UE 115 may determine, based on the set of connectivity preferences for the second UE 115, a network protocol to use for communication with the second UE. The operations of block 1210 may be performed according to the methods described herein. In certain examples, aspects of the operations of block 1210 may be performed by a protocol component as described with reference to FIGS. 7 through 9.

At block 1215 the UE 115 may communicate with the second UE according to the determined network protocol. The operations of block 1215 may be performed according to the methods described herein. In certain examples, aspects of the operations of block 1215 may be performed by a communicator as described with reference to FIGS. 7 through 9.

Figure 13:
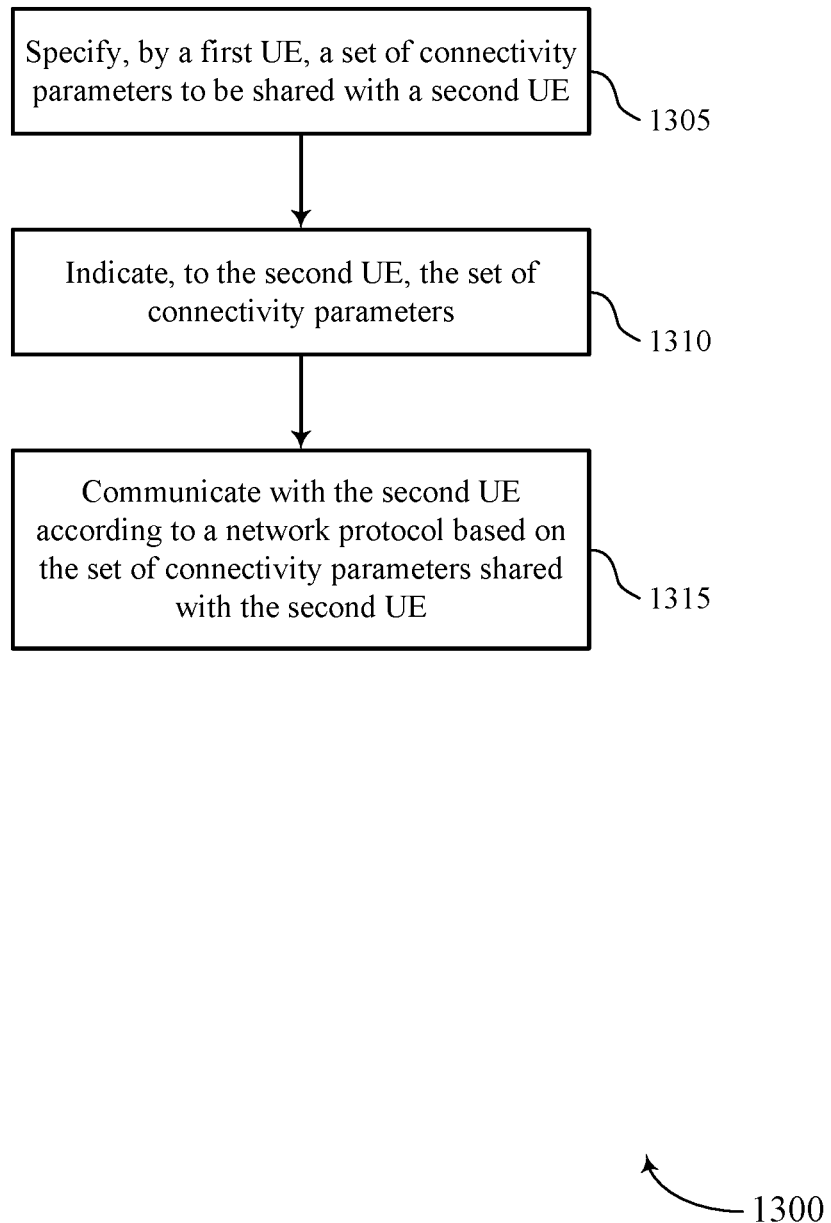

FIG. 13 shows a flowchart illustrating a method 1300 for techniques for using target information in wireless communications in accordance with aspects of the present disclosure. The operations of method 1300 may be implemented by a UE 115 or its components as described herein. For example, the operations of method 1300 may be performed by a communications manager as described with reference to FIGS. 7 through 9. In some examples, a UE 115 may execute a set of codes to control the functional elements of the device to perform the functions described below. Additionally or alternatively, the UE 115 may perform aspects of the functions described below using special-purpose hardware.

At block 1305 the UE 115 may specify a set of connectivity parameters to be shared with a second UE. The operations of block 1305 may be performed according to the methods described herein. In certain examples, aspects of the operations of block 1305 may be performed by a preference specifier as described with reference to FIGS. 7 through 9.

At block 1310 the UE 115 may indicate, to the second UE 115, the set of connectivity parameters. The operations of block 1310 may be performed according to the methods described herein. In certain examples, aspects of the operations of block 1310 may be performed by a connectivity indicator as described with reference to FIGS. 7 through 9.

At block 1315 the UE 115 may communicate with the second UE according to a network protocol based on the set of connectivity parameters shared with the second UE. The operations of block 1315 may be performed according to the methods described herein. In certain examples, aspects of the operations of block 1315 may be performed by a network component as described with reference to FIGS. 7 through 9.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first user equipment (UE) having a plurality of subscriber identity modules (SIMs), comprising:

transmitting, to a second UE, a request for subscription parameters for one or more SIMs of the second UE;

receiving, from the second UE, the subscription parameters for one or more SIMs of the second UE in response to the request;

identifying a set of subscription parameters for the second UE, wherein the set of subscription parameters for the second UE is based at least in part on the subscription parameters for the one or more SIMs of the second UE;

determining, based at least in part on the set of subscription parameters for the second UE, a SIM of the plurality of SIMs of the first UE to use for communication with the second UE; and communicating with the second UE using the determined SIM.

2. The method of claim 1, further comprising:

selecting a SIM of the plurality of SIMs of the first UE based at least in part on the set of subscription parameters for the second UE and a set of subscription parameters for the first UE, wherein communication with the second UE is performed using the selected SIM.

3. The method of claim 2, wherein:
the SIM is selected according to a SIM pairing between at least one SIM of the first UE and at least one SIM of the second UE.

4. The method of claim 1, wherein identifying the set of subscription parameters comprises:
identifying subscription information of the second UE that is shared by the second UE.

5. The method of claim 1, wherein:
the SIM to use for communication with the second UE is determined based on a quality of service parameter or a cost parameter.

6. The method of claim 1, wherein:
the set of subscription parameters for the second UE is selected using a configurable graphical user interface (GUI) of the second UE.

7. The method of claim 1, wherein:
the set of subscription parameters comprises an application specific parameter, a contact specific parameter, an operating condition parameter, or a combination thereof associated with the second UE.

8. A method for wireless communication, comprising:
specifying, by a first user equipment (UE), a set of subscription parameters of the first UE to be shared with a second UE;
receiving, from the second UE, a request for subscription information for one or more subscriber identity modules (SIMs) of the first UE;
indicating, to the second UE, the set of subscription parameters of the first UE, wherein the set of subscription parameters is indicated to the second UE in response to the request; and
communicating with the second UE based at least in part on the set of subscription parameters shared with the second UE.

9. The method of claim 8, wherein specifying the set of subscription parameters comprises:
selecting, by the first UE, subscription information to be shared with the second UE using a configurable graphical user interface (GUI).

10. The method of claim 8, wherein:
the subscription information is associated with the one or more SIMs of the first UE.

11. The method of claim 8, wherein indicating the set of subscription parameters comprises:
transmitting, to the second UE, the set of subscription parameters in response to the request.

12. The method of claim 8, wherein:
the set of subscription parameters comprises a signal quality parameter, a roaming parameter, an operator parameter, or a combination thereof.

13. The method of claim 8, wherein:
the set of subscription parameters comprises an application specific parameter, a contact specific parameter, an operating condition parameter, or a combination thereof associated with the first UE.

14. An apparatus for wireless communication at a first user equipment (UE) having a plurality of subscriber identity modules (SIMs), comprising:
means for transmitting, to a second UE, a request for subscription parameters for one or more SIMs of the second UE;
means for receiving, from the second UE, the subscription parameters for one or more SIMs of the second UE in response to the request;
means for identifying a set of subscription parameters for the second UE, wherein the set of subscription parameters for the second UE is based at least in part on the subscription parameters for the one or more SIMs of the second UE;
means for determining, based at least in part on the set of subscription parameters for the second UE, a SIM of the plurality of SIMs of the first UE to use for communication with the second UE; and
means for communicating with the second UE using the determined SIM.

15. The apparatus of claim 14, further comprising:
means for selecting a SIM of the plurality of SIMs of the first UE based at least in part on the set of subscription parameters for the second UE and a set of subscription parameters for the first UE, wherein communication with the second UE is performed using the selected SIM.

16. The apparatus of claim 15, wherein:
the SIM is selected according to a SIM pairing between at least one SIM of the first UE and at least one SIM of the second UE.

17. The apparatus of claim 14, wherein the means for identifying the set of subscription parameters comprises:
means for identifying subscription information of the second UE that is shared by the second UE.

18. The apparatus of claim 14, wherein:
the SIM to use for communication with the second UE is determined based on a quality of service parameter or a cost parameter.

19. The apparatus of claim 14, wherein:
the set of subscription parameters for the second UE is selected using a configurable graphical user interface (GUI) of the second UE.

20. The apparatus of claim 14, wherein:
the set of subscription parameters comprises an application specific parameter, a contact specific parameter, an operating condition parameter, or a combination thereof associated with the second UE.

21. An apparatus for wireless communication, comprising:
means for specifying, by a first user equipment (UE), a set of subscription parameters of the first UE to be shared with a second UE;
means for receiving, from the second UE, a request for subscription information for one or more subscriber identity modules (SIMs) of the first UE;
means for indicating, to the second UE, the set of subscription parameters of the first UE, wherein the set of subscription parameters is indicated to the second UE in response to the request; and
means for communicating with the second UE based at least in part on the set of subscription parameters shared with the second UE.

22. The apparatus of claim 21, wherein the means for specifying the set of subscription parameters comprises:
means for selecting, by the first UE, subscription information to be shared with the second UE using a configurable graphical user interface (GUI).

23. The apparatus of claim 22, wherein:
the subscription information is associated with the one or more SIMS of the first UE.

24. The apparatus of claim 21, wherein the means for indicating the set of subscription parameters comprises:
means for transmitting, to the second UE, the set of subscription parameters in response to the request.

25. The apparatus of claim 21, wherein:
the set of subscription parameters comprises a signal quality parameter, a roaming parameter, an operator parameter, or a combination thereof.

26. The apparatus of claim 21, wherein:
the set of subscription parameters comprises an application specific parameter, a contact specific parameter, an operating condition parameter, or a combination thereof associated with the first UE.

27. An apparatus for wireless communication at a first user equipment (UE) having a plurality of subscriber identity modules (SIMs), comprising:
a processor;
memory in electronic communication with the processor; and
instructions stored in the memory and operable, when executed by the processor, to cause the apparatus to:
transmit, to a second UE, a request for subscription parameters for one or more SIMs of the second UE;
receive, from the second UE, the subscription parameters for one or more SIMs of the second UE in response to the request;
identify a set of subscription parameters for the second UE, wherein the set of subscription parameters for the second UE is based at least in part on the subscription parameters for the one or more SIMs of the second UE;
determine, based at least in part on the set of subscription parameters for the second UE, a SIM of the plurality of SIMs of the first UE to use for communication with the second UE; and
communicate with the second UE using the determined SIM.

28. The apparatus of claim 27, wherein the instructions are further executable by the processor to:
select a SIM of the plurality of SIMs of the first UE based at least in part on the set of subscription parameters for the second UE and a set of subscription parameters for the first UE, wherein communication with the second UE is performed using the selected SIM.

29. The apparatus of claim 28, wherein:
the SIM is selected according to a SIM pairing between at least one SIM of the first UE and at least one SIM of the second UE.

30. The apparatus of claim 27, wherein the instructions are further executable by the processor to:
identify subscription information of the second UE that is shared by the second UE.

31. The apparatus of claim 27, wherein:
the SIM to use for communication with the second UE is determined based on a quality of service parameter or a cost parameter.

32. The apparatus of claim 27, wherein:
the set of subscription parameters for the second UE is selected using a configurable graphical user interface (GUI) of the second UE.

33. The apparatus of claim 27, wherein:
the set of subscription parameters comprises an application specific parameter, a contact specific parameter, an operating condition parameter, or a combination thereof associated with the second UE.

34. An apparatus for wireless communication, comprising:
a processor;
memory in electronic communication with the processor; and
instructions stored in the memory and operable, when executed by the processor, to cause the apparatus to:
specify, by a first user equipment (UE), a set of subscription parameters of the first UE to be shared with a second UE;
receive, from the second UE, a request for subscription information for one or more subscriber identity modules (SIMs) of the first UE;
indicate, to the second UE, the set of subscription parameters of the first UE, wherein the set of subscription parameters is indicated to the second UE in response to the request; and
communicate with the second UE based at least in part on the set of subscription parameters shared with the second UE.

35. The apparatus of claim 34, wherein the instructions are further executable by the processor to:
select, by the first UE, subscription information to be shared with the second UE using a configurable graphical user interface (GUI).

36. The apparatus of claim 35, wherein:
the subscription information is associated with the one or more SIMs of the first UE.

37. The apparatus of claim 34, wherein the instructions are further executable by the processor to:
transmit, to the second UE, the set of subscription parameters in response to the request.

38. The apparatus of claim 34, wherein:
the set of subscription parameters comprises a signal quality parameter, a roaming parameter, an operator parameter, or a combination thereof.

39. The apparatus of claim 34, wherein:
the set of subscription parameters comprises an application specific parameter, a contact specific parameter, an operating condition parameter, or a combination thereof associated with the first UE.

40. A non-transitory computer readable medium storing code for wireless communication at a first user equipment (UE) having a plurality of subscriber identity modules (SIMs), the code comprising instructions executable by a processor to:
transmit, to a second UE, a request for subscription parameters for one or more SIMs of the second UE;
receive, from the second UE, the subscription parameters for one or more SIMs of the second UE in response to the request;
identify a set of subscription parameters for the second UE, wherein the set of subscription parameters for the second UE is based at least in part on the subscription parameters for the one or more SIMs of the second UE;
determine, based at least in part on the set of subscription parameters for the second UE, a SIM of the plurality of SIMs of the first UE to use for communication with the second UE; and
communicate with the second UE using the determined SIM.

41. The non-transitory computer-readable medium of claim 40, wherein the instructions are further executable by the processor to:
select a SIM of the plurality of SIMs of the first UE based at least in part on the set of subscription parameters for the second UE and a set of subscription parameters for the first UE, wherein communication with the second UE is performed using the selected SIM.

42. The non-transitory computer-readable medium of claim 41, wherein:
the SIM is selected according to a SIM pairing between at least one SIM of the first UE and at least one SIM of the second UE.

43. The non-transitory computer-readable medium of claim 40, wherein the instructions are further executable by the processor to:
identify subscription information of the second UE that is shared by the second UE.

44. The non-transitory computer-readable medium of claim 40, wherein:
the SIM to use for communication with the second UE is determined based on a quality of service parameter or a cost parameter.

45. The non-transitory computer-readable medium of claim 40, wherein:
the set of subscription parameters for the second UE is selected using a configurable graphical user interface (GUI) of the second UE.

46. The non-transitory computer-readable medium of claim 40, wherein:
the set of subscription parameters comprises an application specific parameter, a contact specific parameter, an operating condition parameter, or a combination thereof associated with the second UE.

47. A non-transitory computer readable medium storing code for wireless communication, the code comprising instructions executable by a processor to:
specify, by a first user equipment (UE), a set of subscription parameters of the first UE to be shared with a second UE;
receive, from the second UE, a request for subscription information for one or more subscriber identity modules (SIMs) of the first UE;
indicate, to the second UE, the set of subscription parameters of the first UE, wherein the set of subscription parameters is indicated to the second UE in response to the request; and
communicate with the second UE based at least in part on the set of subscription parameters shared with the second UE.

48. The non-transitory computer-readable medium of claim 47, wherein the instructions are further executable by the processor to:
select, by the first UE, subscription information to be shared with the second UE using a configurable graphical user interface (GUI).

49. The non-transitory computer-readable medium of claim 48, wherein:
the subscription information is associated with the one or more SIMs of the first UE.

50. The non-transitory computer-readable medium of claim 47, wherein the instructions are further executable by the processor to:
transmit, to the second UE, the set of subscription parameters in response to the request.

51. The non-transitory computer-readable medium of claim 47, wherein:
the set of subscription parameters comprises a signal quality parameter, a roaming parameter, an operator parameter, or a combination thereof.

52. The non-transitory computer-readable medium of claim 47, wherein:
the set of subscription parameters comprises an application specific parameter, a contact specific parameter, an operating condition parameter, or a combination thereof associated with the first UE.

* * * * *